US010502330B2

(12) United States Patent
Balkenhol

(10) Patent No.: US 10,502,330 B2
(45) Date of Patent: Dec. 10, 2019

(54) SAFETY VALVE

(71) Applicant: GEA Farm Technologies GmbH, Bönen (DE)

(72) Inventor: Reinhard Balkenhol, Paderborn (DE)

(73) Assignee: GEA Farm Technologies GmbH, Bönen (DE)

( * ) Notice: Subject to any disclaimer, the term of this patent is extended or adjusted under 35 U.S.C. 154(b) by 0 days.

(21) Appl. No.: 15/104,876

(22) PCT Filed: Dec. 15, 2014

(86) PCT No.: PCT/EP2014/077684
§ 371 (c)(1),
(2) Date: Jun. 15, 2016

(87) PCT Pub. No.: WO2015/091319
PCT Pub. Date: Jun. 25, 2015

(65) Prior Publication Data
US 2016/0319947 A1 Nov. 3, 2016

(30) Foreign Application Priority Data

Dec. 20, 2013 (DE) ........................ 10 2013 114 595

(51) Int. Cl.
*F16K 11/07* (2006.01)
*A01J 7/02* (2006.01)
*A01J 5/01* (2006.01)
(52) U.S. Cl.
CPC ............ *F16K 11/0716* (2013.01); *A01J 5/01* (2013.01); *A01J 7/02* (2013.01); *A01J 7/022* (2013.01)

(58) Field of Classification Search
CPC ............ F16K 31/0603; F16K 11/0716; Y10T 137/8667; Y10T 137/86702;
(Continued)

(56) References Cited

U.S. PATENT DOCUMENTS 1,365,665 A   1/1921 Davies
2,012,031 A   8/1935 Woodruff
(Continued)

FOREIGN PATENT DOCUMENTS

AU            641229       9/1993
AU      2013294747 B2      11/2016
(Continued)

OTHER PUBLICATIONS

"Grade A pasteurized milk ordinance" 2003 Revision; US Department Health and Human Services, Public Health Service; Food and Drug Administration.
(Continued)

*Primary Examiner* — Kevin F Murphy
*Assistant Examiner* — Kelsey E Cary
(74) *Attorney, Agent, or Firm* — Smith Law Office; Jeffry W. Smith

(57) ABSTRACT

A safety valve for a cleaning device for a milking installation for milking milk-providing animals having a pair of block valves, a bleed valve, a sliding hollow piston, and a drive unit that are adjustable between a blocking position in which the blocking valves are closed and the bleed valve is open and a throughput position in which the blocking valves are open and the vent valve is closed.

13 Claims, 13 Drawing Sheets

(58) Field of Classification Search
CPC ......... Y10T 137/8671; A01J 5/01; A01J 7/02; A01J 7/022
USPC .......... 137/625.69, 625.68, 625.25, 103, 105
See application file for complete search history.

(56) References Cited

U.S. PATENT DOCUMENTS

| | | | |
|---|---|---|---|
| 2,532,088 A | 11/1950 | Cordis | |
| 2,747,544 A | 5/1956 | Thomas | |
| 3,014,455 A | 12/1961 | Olander | |
| 3,099,246 A | 7/1963 | Beskow | |
| 3,119,401 A | 1/1964 | Merritt et al. | |
| 3,417,763 A | 12/1968 | Fjermestad et al. | |
| 3,461,845 A | 8/1969 | Peterson | |
| 3,474,760 A | 10/1969 | Siddall et al. | |
| 3,482,547 A | 12/1969 | Maier | |
| 3,500,839 A | 3/1970 | Bender | |
| 3,630,081 A | 12/1971 | Nelson | |
| 3,648,696 A | 3/1972 | Keith | |
| 3,688,783 A | 9/1972 | Owens | |
| 3,696,790 A | 10/1972 | Albright | |
| 3,713,423 A | 1/1973 | Sparr, Sr. | |
| 3,726,253 A | 4/1973 | Duncan | |
| 3,762,371 A | 10/1973 | Quayle et al. | |
| 3,789,798 A | 2/1974 | Reisgies et al. | |
| 3,797,525 A | 3/1974 | Lieser | |
| 3,861,335 A | 1/1975 | Przewalski | |
| 3,861,355 A | 1/1975 | Johnson et al. | |
| 3,957,018 A | 5/1976 | Barrett | |
| 3,971,512 A | 7/1976 | Duncan | |
| 3,973,520 A | 8/1976 | Flocchini | |
| 4,034,714 A | 7/1977 | Umbaugh et al. | |
| 4,061,504 A | 12/1977 | Zall et al. | |
| 4,149,489 A | 4/1979 | Umbaugh et al. | |
| 4,168,677 A | 9/1979 | Brown | |
| 4,175,514 A | 11/1979 | Souza et al. | |
| 4,177,760 A | 12/1979 | Slater | |
| 4,222,346 A | 9/1980 | Reisgies | |
| 4,253,421 A | 3/1981 | Slater et al. | |
| 4,295,490 A | 10/1981 | Boudreau | |
| 4,305,346 A | 12/1981 | Sparr, Sr. | |
| 4,332,215 A | 6/1982 | Larson | |
| 4,333,387 A * | 6/1982 | Seitz | F15B 13/04 137/557 |
| 4,333,421 A | 6/1982 | Schluckbier | |
| 4,344,385 A | 8/1982 | Swanson et al. | |
| 4,372,345 A | 2/1983 | Menus | |
| 4,378,757 A | 4/1983 | Hamann | |
| 4,393,811 A | 7/1983 | Bodmin | |
| 4,395,971 A | 8/1983 | Happel et al. | |
| 4,403,568 A | 9/1983 | Fukuhara et al. | |
| 4,403,569 A | 9/1983 | Bennett | |
| 4,459,938 A | 7/1984 | Noorlander | |
| 4,462,425 A | 7/1984 | Menus | |
| 4,485,762 A | 12/1984 | Sutton et al. | |
| 4,498,419 A | 2/1985 | Flocchini | |
| 4,516,530 A | 5/1985 | Reisgies et al. | |
| 4,572,105 A | 2/1986 | Chowdhury et al. | |
| 4,586,462 A | 5/1986 | Icking | |
| 4,593,649 A | 6/1986 | Britten | |
| 4,903,639 A | 2/1990 | Kessel | |
| 4,907,535 A | 3/1990 | Matsuzawa et al. | |
| 4,924,809 A | 5/1990 | Verbrugge | |
| 4,936,254 A | 6/1990 | Marshall | |
| 5,052,341 A | 10/1991 | Woolford et al. | |
| 5,101,770 A | 4/1992 | Stevenson | |
| 5,134,967 A | 8/1992 | Marshall | |
| 5,161,482 A | 11/1992 | Griffin | |
| 5,166,313 A | 11/1992 | Archibald et al. | |
| 5,167,201 A | 12/1992 | Peles | |
| 5,178,095 A | 1/1993 | Mein | |
| 5,218,924 A | 6/1993 | Thompson et al. | |
| 5,255,628 A | 10/1993 | Kristoffer | |
| 5,379,722 A | 1/1995 | Larson | |
| 5,386,799 A | 2/1995 | Dietrich | |
| 5,390,627 A | 2/1995 | Van Der Berg et al. | |
| 5,403,005 A | 4/1995 | Avila-Valdez | |
| 5,493,995 A | 2/1996 | Chowdhury | |
| 5,568,788 A | 10/1996 | Van Den Berg et al. | |
| 5,572,947 A | 11/1996 | Larson et al. | |
| 5,673,650 A | 10/1997 | Mottram et al. | |
| 5,697,325 A | 12/1997 | Gehm et al. | |
| 5,722,343 A | 3/1998 | Aurik et al. | |
| 5,769,025 A | 6/1998 | Van Der Lely et al. | |
| 5,778,820 A | 7/1998 | Van Der Lely et al. | |
| 5,850,845 A | 12/1998 | Pereira et al. | |
| 5,881,669 A | 3/1999 | Van Den Berg et al. | |
| 5,896,828 A | 4/1999 | Kronschnabel et al. | |
| 5,909,716 A | 6/1999 | Van Der Lely | |
| 5,934,220 A | 8/1999 | Hall et al. | |
| 5,957,081 A | 9/1999 | Van Der Lely et al. | |
| 5,960,736 A | 10/1999 | Ludington et al. | |
| 5,992,347 A | 11/1999 | Innings et al. | |
| 6,009,833 A | 1/2000 | Van Der Lely | |
| 6,079,359 A | 6/2000 | Van Den Berg | |
| 6,089,242 A | 7/2000 | Buck | |
| 6,098,570 A | 8/2000 | Aurik et al. | |
| 6,202,593 B1 | 3/2001 | Maier et al. | |
| 6,234,110 B1 | 5/2001 | Xavier | |
| 6,244,215 B1 | 6/2001 | Oosterling | |
| 6,267,077 B1 | 7/2001 | Van Den Berg et al. | |
| 6,276,297 B1 | 8/2001 | Van Den Berg et al. | |
| 6,308,655 B1 | 10/2001 | Oosterling | |
| 6,318,299 B1 | 11/2001 | Birk | |
| 6,321,682 B1 | 11/2001 | Eriksson et al. | |
| 6,367,416 B1 | 4/2002 | Van Der Lely | |
| 6,371,046 B1 | 4/2002 | Petterson et al. | |
| 6,435,132 B1 | 8/2002 | Milbrath et al. | |
| 6,546,893 B1 | 4/2003 | Happel et al. | |
| 6,550,420 B1 | 4/2003 | Bjork | |
| 6,561,126 B2 | 5/2003 | Forsen et al. | |
| 6,584,930 B2 | 7/2003 | Buecker | |
| 6,591,784 B1 | 7/2003 | Eriksson | |
| 6,598,560 B1 | 7/2003 | Van Den Berg | |
| 6,619,227 B1 | 9/2003 | Berger et al. | |
| 6,626,130 B1 | 9/2003 | Eriksson | |
| 6,644,240 B1 | 11/2003 | Dietrich | |
| 6,752,102 B2 | 6/2004 | Dahl et al. | |
| 6,755,153 B1 | 6/2004 | Chowdhury | |
| 6,935,270 B2 | 8/2005 | Wipperfurth et al. | |
| 6,997,136 B1 | 2/2006 | Coates | |
| 7,036,981 B2 | 5/2006 | Veenstra et al. | |
| 7,128,020 B2 | 10/2006 | Björk et al. | |
| 7,143,718 B2 | 12/2006 | Bosma et al. | |
| 7,162,970 B2 | 1/2007 | Maier, Jr. | |
| 7,174,848 B2 | 2/2007 | Brown et al. | |
| 7,178,480 B2 | 2/2007 | Dahl et al. | |
| 7,237,694 B2 | 7/2007 | Freudinger | |
| 7,263,948 B2 | 9/2007 | Ericsson et al. | |
| 7,281,493 B2 | 10/2007 | Dietrich | |
| 7,290,497 B2 | 11/2007 | Rottier et al. | |
| 7,350,478 B2 | 4/2008 | Fernandez | |
| 7,377,232 B2 | 5/2008 | Holmgren et al. | |
| 7,401,573 B2 | 7/2008 | Torgerson | |
| 7,412,943 B2 | 8/2008 | Ericsson et al. | |
| 7,484,474 B2 | 2/2009 | Van Den Berg et al. | |
| 7,536,975 B2 | 5/2009 | Denes et al. | |
| 7,575,022 B2 | 8/2009 | Higgins | |
| 7,578,260 B2 | 8/2009 | Shin | |
| 7,707,966 B2 | 5/2010 | Torgerson et al. | |
| 7,765,951 B2 | 8/2010 | Dietrich | |
| 7,793,614 B2 | 9/2010 | Ericsson et al. | |
| 7,926,449 B2 | 4/2011 | Stellnert et al. | |
| 7,963,249 B2 | 6/2011 | Duke | |
| 8,025,029 B2 | 9/2011 | Torgerson et al. | |
| 8,033,247 B2 | 10/2011 | Torgerson et al. | |
| 8,117,989 B2 | 2/2012 | Torgerson et al. | |
| 8,210,123 B2 | 7/2012 | Duke | |
| 8,240,272 B2 | 8/2012 | Duke | |
| 8,342,125 B2 | 1/2013 | Torgerson et al. | |
| 8,590,486 B2 | 11/2013 | Torgerson et al. | |
| 8,677,937 B2 | 3/2014 | Shin | |
| 8,770,146 B2 | 7/2014 | Buck et al. | |
| 9,016,238 B2 | 4/2015 | Duke | |

(56) References Cited

U.S. PATENT DOCUMENTS

| | | |
|---|---|---|
| 9,049,835 B2 | 6/2015 | Duke |
| 9,468,190 B2 | 10/2016 | Duke |
| 9,686,958 B2 | 6/2017 | Sellner et al. |
| 2002/0185071 A1 | 12/2002 | Guo |
| 2004/0089242 A1 | 5/2004 | Verstege et al. |
| 2004/0231603 A1 | 11/2004 | Bjork et al. |
| 2005/0274327 A1 | 12/2005 | Johnsson et al. |
| 2006/0016399 A1 | 1/2006 | Torgerson |
| 2006/0037542 A1 | 2/2006 | Denes et al. |
| 2006/0112887 A1 | 6/2006 | Brown et al. |
| 2007/0070803 A1 | 3/2007 | Urquhart |
| 2007/0157887 A1 | 7/2007 | Fernandez |
| 2007/0186860 A1 | 8/2007 | Dietrich |
| 2007/0215053 A1 | 9/2007 | Duke |
| 2007/0277737 A1 | 12/2007 | Maier et al. |
| 2008/0022932 A1 | 1/2008 | Rottier et al. |
| 2008/0202433 A1 | 8/2008 | Duke |
| 2008/0276871 A1 | 11/2008 | Auburger et al. |
| 2008/0314322 A1 | 12/2008 | Stellnert et al. |
| 2009/0020718 A1* | 1/2009 | Stallmann ........... F16K 11/0716 251/324 |
| 2009/0050061 A1 | 2/2009 | Duke |
| 2009/0050062 A1 | 2/2009 | Auburger et al. |
| 2009/0064937 A1 | 3/2009 | Rottier et al. |
| 2009/0151641 A1 | 6/2009 | Schulze Wartenhorst et al. |
| 2009/0165724 A1 | 7/2009 | Mader et al. |
| 2009/0320760 A1 | 12/2009 | Torgerson et al. |
| 2010/0043738 A1* | 2/2010 | Grandvallet ........ F16K 31/0603 123/90.39 |
| 2010/0084031 A1* | 4/2010 | Hunnicutt ........... F15B 13/0402 137/625.66 |
| 2010/0132626 A1 | 6/2010 | Torgerson et al. |
| 2010/0154900 A1 | 6/2010 | Torgerson et al. |
| 2010/0236487 A1 | 9/2010 | Stellnert et al. |
| 2010/0326360 A1 | 12/2010 | Duke et al. |
| 2011/0220028 A1 | 9/2011 | Duke |
| 2011/0220160 A1 | 9/2011 | Bosma |
| 2011/0232575 A1 | 9/2011 | Duke |
| 2012/0017836 A1 | 1/2012 | Torgerson |
| 2012/0111275 A1 | 5/2012 | Torgerson et al. |
| 2012/0118237 A1 | 5/2012 | Torgerson et al. |
| 2012/0118238 A1 | 5/2012 | Torgerson et al. |
| 2012/0272911 A1 | 11/2012 | Duke |
| 2013/0199449 A1 | 8/2013 | Daniel |
| 2014/0283751 A1 | 9/2014 | Buck et al. |
| 2015/0201577 A1 | 7/2015 | Duke |
| 2015/0260302 A1* | 9/2015 | Peterson ............ F16K 31/0613 251/129.15 |
| 2017/0014837 A1 | 1/2017 | Duke |
| 2017/0164576 A1 | 6/2017 | Balkenhol et al. |
| 2017/0359995 A1 | 12/2017 | Sellner et al. |
| 2018/0064056 A1 | 3/2018 | Torgerson et al. |
| 2018/0220616 A1 | 8/2018 | Torgerson et al. |
| 2018/0235173 A1 | 8/2018 | Torgerson et al. |

FOREIGN PATENT DOCUMENTS

| | | |
|---|---|---|
| AU | 2015227478 B2 | 6/2018 |
| DE | 1582939 | 7/1970 |
| DE | 2622794 | 12/1977 |
| DE | 3540058 | 5/1987 |
| DE | 261300 | 10/1988 |
| DE | 4006785 | 9/1990 |
| DE | 10160161 A1 | 6/2003 |
| EP | 0277396 A1 | 8/1988 |
| EP | 0313109 A1 | 4/1989 |
| EP | 0319523 A2 | 6/1989 |
| EP | 0332235 A2 | 9/1989 |
| EP | 0459817 A1 | 12/1991 |
| EP | 0479397 A2 | 4/1992 |
| EP | 0527509 A2 | 2/1993 |
| EP | 0543463 A1 | 5/1993 |
| EP | 0630557 A2 | 12/1994 |
| EP | 0728412 A1 | 8/1996 |
| EP | 0801893 A2 | 10/1997 |
| EP | 0945057 A1 | 9/1999 |
| EP | 1219167 A2 | 7/2002 |
| EP | 1222853 A2 | 7/2002 |
| EP | 1089615 B1 | 3/2003 |
| EP | 1520469 A1 | 4/2005 |
| EP | 1543720 A1 | 6/2005 |
| EP | 1790217 A2 | 5/2007 |
| EP | 1795069 A1 | 6/2007 |
| EP | 1679956 B1 | 12/2008 |
| EP | 2113169 A1 | 11/2009 |
| EP | 1933616 B1 | 1/2011 |
| EP | 2277373 A2 | 1/2011 |
| EP | 1737291 B1 | 11/2013 |
| GB | 918766 | 2/1963 |
| GB | 1160900 | 8/1969 |
| GB | 1440901 | 6/1976 |
| GB | 0324647.7 | 10/2003 |
| GB | 0402119.2 | 1/2004 |
| GB | 0408968.6 | 4/2004 |
| GB | 0417392.8 | 4/2004 |
| JP | 2002-345955 | 12/2002 |
| JP | 2002354958 | 12/2002 |
| JP | 2005-192404 | 7/2005 |
| NL | 1016237 | 3/2002 |
| NL | 1021950 C | 5/2004 |
| SU | 1676538 | 9/1991 |
| WO | 1993/13651 | 7/1993 |
| WO | 1998/28969 | 7/1998 |
| WO | 1999/27775 | 6/1999 |
| WO | 1999/46978 | 9/1999 |
| WO | 1999/66767 | 12/1999 |
| WO | 1999/66787 | 12/1999 |
| WO | 01/17337 | 3/2001 |
| WO | 01/17338 | 3/2001 |
| WO | 02/07506 | 1/2002 |
| WO | 02/23976 | 3/2002 |
| WO | 03/030630 | 4/2003 |
| WO | 03/077645 | 9/2003 |
| WO | 03/098998 | 12/2003 |
| WO | 04/032608 | 4/2004 |
| WO | 2004/030445 A2 | 4/2004 |
| WO | 05/022986 | 3/2005 |
| WO | 05/043986 | 5/2005 |
| WO | 05/072516 | 8/2005 |
| WO | 05/102035 | 11/2005 |
| WO | 2006/029797 | 3/2006 |
| WO | 2006/110079 | 10/2006 |
| WO | 2006/117019 | 11/2006 |
| WO | 2006/135917 | 12/2006 |
| WO | 2007/31783 | 3/2007 |
| WO | 2007/129884 | 11/2007 |
| WO | 2007/129888 | 11/2007 |
| WO | 2008/102567 | 8/2008 |
| WO | 2008/138862 | 11/2008 |
| WO | 2009/077607 | 6/2009 |
| WO | 2009/158000 | 12/2009 |
| WO | 2010/053577 | 5/2010 |
| WO | 2011/28292 | 3/2011 |
| WO | 2011/28293 | 3/2011 |
| WO | 2011/28294 | 3/2011 |
| WO | 2011102911 | 8/2011 |
| WO | 2014/016588 | 1/2014 |
| WO | 2015/118336 | 8/2015 |
| WO | 2015/145116 | 10/2015 |
| WO | 2015/150807 | 10/2015 |

OTHER PUBLICATIONS

"3-A® Accepted Practices for Permanently Installed Product and Solution Pipelines and Cleaning Systems Used in Milk and Milk Product Processing Plants, No. 605-04," Section N; Aug. 20, 1994.

Akam, D.N., "The Development of Equipment for the Mechanization of Manual Operations in Milking Machine," 17th Annual Meeting, National Mastitis Counsel, Inc., Feb. 21-23, 1978, pp. 417-426.

(56) References Cited

OTHER PUBLICATIONS

Grindal; et al., "Automatic application of teat disinfectant through the milking machine cluster" Journal of Dairy Research, 56:579-585 (1989).
International Search Report and Written Opinion from PCT/US2011/00322, dated Dec. 20, 2011.
Letter to Alex Ferguson from Jeffry W. Smith dated Dec. 22, 2006, 2pp.
Neijenhuis; et al., "Health of dairy cows milked by an automatic milking system; Effects of milking interval on teat condition and milking performance with whole-udder take off", Oct. 2003, 23 pages.
Office Action for U.S. Appl. No. 10/576,744 dated Jun. 3, 2010, 8pp.
Office Action for U.S. Appl. No. 11/652,372 dated Feb. 11, 2008, 14pp.
Office Action for U.S. Appl. No. 11/662,454 dated Aug. 16, 2010, 20pp.
Office Action for U.S. Appl. No. 11/904,769 dated Feb. 20, 2008, 9pp.
Office Action for U.S. Appl. No. 12/712,787 dated Jun. 27, 2011.
PCT/GB04/004343—Written Opinion of ISA & IPRP rec'd dated Feb. 3, 2005, 5pp.
PCT/US06/023075—ISR & Written Opinion rec'd dated Oct. 16, 2006.
PCT/US09/006026—IPRP, Written Opinion of ISA & ISR rec'd dated Mar. 6, 2010, 9pp.
PCT/US09/03770—IPRP and Written Opinion rec'd dated Jan. 13, 2011, and ISR rec'd dated Oct. 7, 2009.
Preliminary Amendment for U.S. Appl. No. 10/576,744, filed Apr. 21, 2006, 16pp.
Preliminary Amendment for U.S. Appl. No. 10/576,744, filed Aug. 7, 2008, 10 pp.
Shearn; et al., "Reduction of bacterial contamination of teatcup liners by an entrained wash system," Veterinary Record (1994), 134, 450, 1p.
Thompson; et al. "The End-Of-Milking Sequence and its Mechanization" 1976 Winter Mtg., Dec. 14-17, 1976, Animal Physiology and Genetics Inst., Beltsville, MD, 15pp.
U.S. Appl. No. 60/566,313, filed Apr. 29, 2004, J.R.J. Duke.
U.S. Appl. No. 60/566,314, filed Apr. 29, 2004, J.R.J. Duke.
U.S. Appl. No. 60/578,997, filed Jun. 12, 2004, Kevin L. Torgerson.
Notice of Opposition and Opposition brief for EP Patent 1737291, Filed on Aug. 26, 2014 by GEA Farm Technologies GmbH, 74 pages.
Response filed Feb. 2, 2015 by an Udder IP Company in the Opposition of EP Patent 1737291, 53 pages.
European Search Report dated Sep. 24, 2015 for EP Application No. 15171008.4, 6 pages.
Reply filed on Dec. 16, 2015 by GEA Farm Technologies GmbH in the Opposition of EP Patent No. 1737291, 75 pages.
Wildbrett; et al., "Über Reinigung und Desinfektion von Tanks" Materials und Corrosion 12(12):759-764. Nov. 1961.
European Patent Office Preliminary Opinion and Summons to Attend Oral Proceedings dated Jan. 18, 2016, Opposition of EP Patent 1737291, 12 pages.
European Search Report dated Aug. 13, 2014, EP Application No. 14159588.4, 5 pages.
International Search Report and Written Opinion from PCT/EP2014/077684, dated Apr. 10, 2015, 10 pages.
Amendments and Observations filed Oct. 24, 2016 by the Proprietor: An Udder IP Company Ltd in the Opposition of EP Patent 1737291, 47 pages.
Amendments and Observations filed Oct. 25, 2016 by the opponent: GEA Farm Technologies GmbH in the Opposition of EP Patent 1737291, 13 pages.
Nov. 10, 2016 EPO Communication re: the Proprietor, an Udder IP Company Ltd's request concerning the staying/postponement of the opposition proceedings, Opposition of EP Patent 1737291, 1 page.
Nov. 25, 2016 EPO Communication re: results of the oral proceedings, Opposition of EP Patent 1737291, 5 pages.
Dec. 8, 2016 EPO Communication; Details and minutes of the oral proceedings, Opposition of EP Patent 1737291, 13 pages.
Jul. 27, 2017 EPO Communication; State of the Opposition Procedure and Summons to Attend Oral Proceedings, Opposition of EP Patent 1737291, 10 pages.
Mar. 30, 2017 EPO Communication, State of the Opposition Procedure and Invitation to File Observations, Opposition of EP Patent 1737291, 10 pages.
Response filed by the proprietor, an Udder IP Company Ltd dated Jun. 2, 2017, 4 pages.
Response filed by the opponent, GEA Farm Technologies GmbH. dated May 29, 2017, 5 pages.
International Search Report and Written Opinion dated Apr. 10, 2015, International Application No. PCT/EP2014/077684, 10 pages.
European Search Report dated Oct. 13, 2017, for European Application No. 17171229.2, 6 pages.
Mar. 13, 2018 Letter from the Proprietor, An Udder IP Company Ltd, Regarding the Opposition Procedure for Opposition of EP Patent 1737291, 23 pages.
May 17, 2018 EPO Communication; Details and minutes of the oral proceedings, Opposition of EP Patent 1737291, 9 pages.
May 31, 2018 Interlocutory Decision in Opposition Proceedings, Opposition of EP Patent 1737291, 49 pages.
Sep. 27, 2018 Statement of Grounds for Appeal, Opposition of EP Patent 1737291, 29 pages.
Feb. 4, 2019 Reply to Grounds for Appeal, Opposition of EP Patent 1737291, 32 pages.

* cited by examiner

SAFETY VALVE

CROSS REFERENCE TO RELATED APPLICATIONS

This application is a national phase application under 35 U.S.C. § 371 of PCT International Application No. PCT/EP2014/077684, filed Dec. 15, 2014, which claims priority to German Application No. 10 2013 114 595.7, filed Dec. 20, 2013, the disclosures of which are incorporated by reference herein.

FIELD AND BACKGROUND OF THE INVENTION

The invention relates to a safety valve as claimed in the preamble of claim 1.

Safety valves for this type are also referred to as block-bleed-block valves and employed in cleaning devices for milking installations, in particular for automatic milking of milk-providing animals, for example of cows, sheep, goats. The automatic milking procedure may be carried out by means of so-called milking robots. The safety valve is required for introducing a so-called dipping fluid onto the teat of a milk-providing animal.

Relevant national rules and guidelines, for example the American FDA guidelines, which apply to cleaning devices for milking installations and milking equipment, which come into contact with milk, have to be observed and adhered to.

The safety valve comprises two block valves and one bleed valve, and is adjusted to and fro between a first switched position which hereunder is referred to as the blocking position, and a second switched position which hereunder is referred to as the throughput position. In the blocking position, the block valves have to be simultaneously closed and the bleed valve has to be opened, wherein in the throughput position the block valves are opened and the bleed valve is closed.

Document US 2012/0017836 A1 describes a safety valve for a cleaning device for an automatic milking installation. The function and construction of a cleaning device is furthermore stated in document WO 2010/053577 A1.

By virtue of the ever increasing requirements in particular in terms of high throughput rates and of continuous operation at low maintenance or at long maintenance intervals, respectively, in the case of present cleaning devices for milking installations or milking robots, respectively, which are complex and cost-intensive, there is demand for an improved safety valve.

The solutions which have been proposed to date have an excessively large installation space, excessive costs, and low to insufficient resistance to the media used.

Against this background the object of the invention lies in providing an improved safety valve.

SUMMARY OF THE INVENTION

This object is achieved by a safety valve having the features of claim 1.

A safety valve according to the invention for a cleaning device for a milking installation for milking milk-providing animals comprises a first block valve having an intake, a second block valve having an exhaust, a bleed valve having a bleed outlet, a piston, and a drive unit wherein the safety valve is configured so as to be adjustable to and fro between a blocking position in which the first block valve and the second block valve, in order to block the intake and the exhaust, are closed and the bleed valve, in order to connect the bleed outlet to a connection is opened, and a throughput position in which the first block valve and the second block valve, in order to connect the intake by way of the connection to the exhaust, are opened and the bleed valve, in order to block the bleed outlet, is closed. The safety valve is configured as a directional valve, the piston being a hollow piston.

In this way it is advantageously achieved that a commercially available and cost-effective directional valve of high quality may be used as a basis. The piston is formed by a hollow piston.

In one embodiment, the hollow piston has a cavity as a connection. In this way, a particularly favorable and space-saving embodiment is enabled.

It is provided that the cavity extends in the direction of a longitudinal piston axis of the hollow piston. Simple manufacturing is enabled in this way. The hollow piston is made from a material, for example from stainless steel, which is resistant to the media used. Of course, the material may also be a plastics material having corresponding resistance. Combinations of various materials are also possible, of course. A longer service life may be achieved in particular in relation to iodine or iodine compounds which may be contained in the media.

In one refinement of the embodiment, the cavity comprises a first opening and a second opening. Simple configuration of the valves is possible on account thereof.

In one further embodiment, in the blocking position the first block valve and the second block valve, in order to block the intake and the exhaust, are closed by the hollow piston, the bleed valve connecting the bleed outlet to the cavity of the hollow piston. This is advantageously possible by way of the hollow piston. Here, further advantages result in that it is ensured in a simple manner in the case of potential leakages that no medium may find its way from the intake to the outlet in an uncontrolled manner.

In one further embodiment, in the throughput position the first block valve by way of the first opening may communicate with the cavity of the hollow piston, and the second block valve by way of the second opening may communicate with the cavity of the hollow piston, in order to connect the intake to the exhaust, the bleed valve, in order to block the bleed outlet, being closed by the hollow piston. In this way, a plurality of functions are advantageously unified in the hollow piston, without additional components being required. It is only the hollow piston that is required. Seals and spacers of a regular directional valve may be used. The material of said seals and spacers need only have a suitable resistance to media.

In one even further embodiment it is provided that the hollow piston, in order to be adjusted from the blocking position to the throughput position of the safety valve and vice-versa, is connected to a drive element. This advantageously may be a pneumatic and/or electric drive.

In another embodiment, the safety valve has a pretensioned force accumulator element which pretensions the hollow piston to the blocking position and retains the latter in the blocking position. In this way, the blocking position may simply assume a basic position and a safety position.

In an even further embodiment, the safety valve has a sensor unit for detecting the blocking position and/or the throughput position. If and when this sensor unit interacts with the hollow piston directly and/or indirectly by way of a drive element, particularly advantageous monitoring of the safety valve by the sensor unit is possible, since the current position of the hollow piston may be detected independently of an activated or a non-activated drive unit.

To this end, the sensor unit may interact with a magnetic element which is attached to the hollow piston and/or the drive element. Compact construction having high reliability is thus possible.

In one embodiment the safety valve has a valve body of a 3/2-way valve having the hollow piston. Such a valve body, including the seals thereof, is commercially available in a cost-effective manner and at high quality. Many types of application may be possible in particular in the case of a modular construction.

In one alternative embodiment, the safety valve may have a valve body of a 5/2-way valve having the hollow piston. In this way, particular protection of the force accumulator element (for example a compression spring) by virtue of construction-related comparatively long leakage paths of the medium in the case of any leakages, on the one hand, and by virtue of additional connectors, on the other hand, is possible.

In one embodiment the intake in the blocking position is connected to an additional connector, wherein the additional connector is constricted by a nozzle, an exit cross section of the nozzle being substantially smaller than a cross section of the additional connector. In this way, the advantage of ventilation of the intake is achieved, so as to enable a volumetric flow for preventing an undesirable flow of milk into the dipping hose, or into the line of the dipping medium, respectively. A further advantage lies in that a so-called headspace volume on the teat head may be reduced.

In one variant the cavity of the hollow piston in the blocking position by way of a first opening is connected to the bleed outlet, and by way of a second opening is connected to an additional connector. In this way, the cavity may be ventilated/aspirated or purged and/or cleaned, respectively, in a particularly advantageous manner, for example using one or a plurality of media.

With the exception of the hollow piston and of the sensor unit, the safety valve may be composed of a plastics material. The screws and the fastening elements, respectively, of covers, the drive unit, and sensor unit may also be of a plastics material. On account thereof, a low weight and a compact construction are achieved.

By virtue of the regular valve housing, a plurality of safety valves may be interconnected in a simple manner and be used in a compact manner as a safety valve assembly.

BRIEF DESCRIPTION OF THE DRAWINGS

Further advantages and details are derived from the exemplary embodiment illustrated in the figures of the drawing, in which:

FIGS. 9-9a show schematic sectional views of the variant of the second exemplary embodiment as per FIGS. 8-8a.

DETAILED DESCRIPTION OF THE INVENTION

Same or equivalent functional elements and components, respectively, are provided with the same reference sign in the figures.

The terms "top", "bottom", "left", right" refer to the respective arrangement in the figures. An installed position, for example, being inverted, lateral, or in any other position, is not limited thereto.

Figure 1:
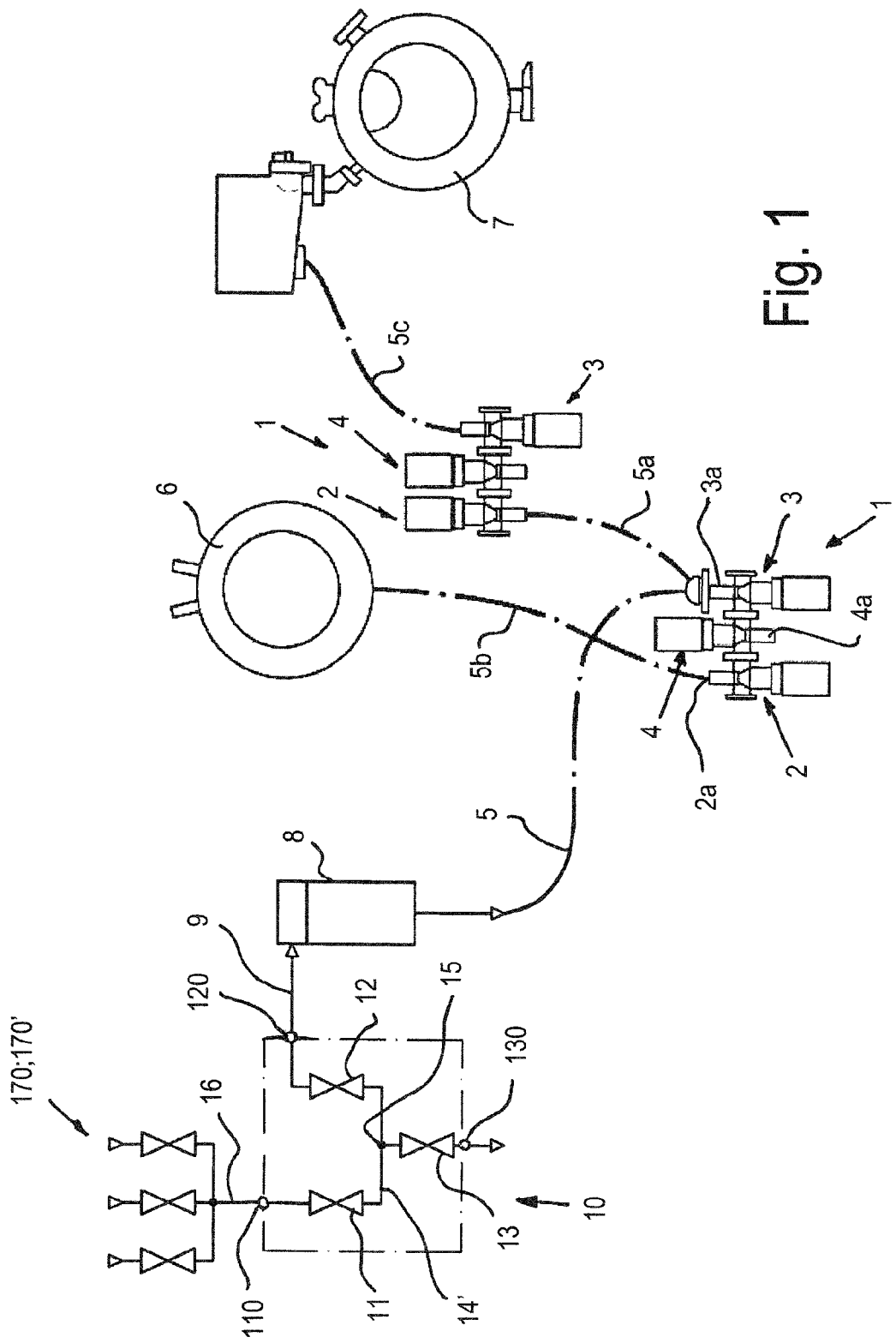
FIG. 1 shows a schematic illustration of an exemplary type of application of a safety valve according to the invention, together with a safety valve device.
Figure 2:
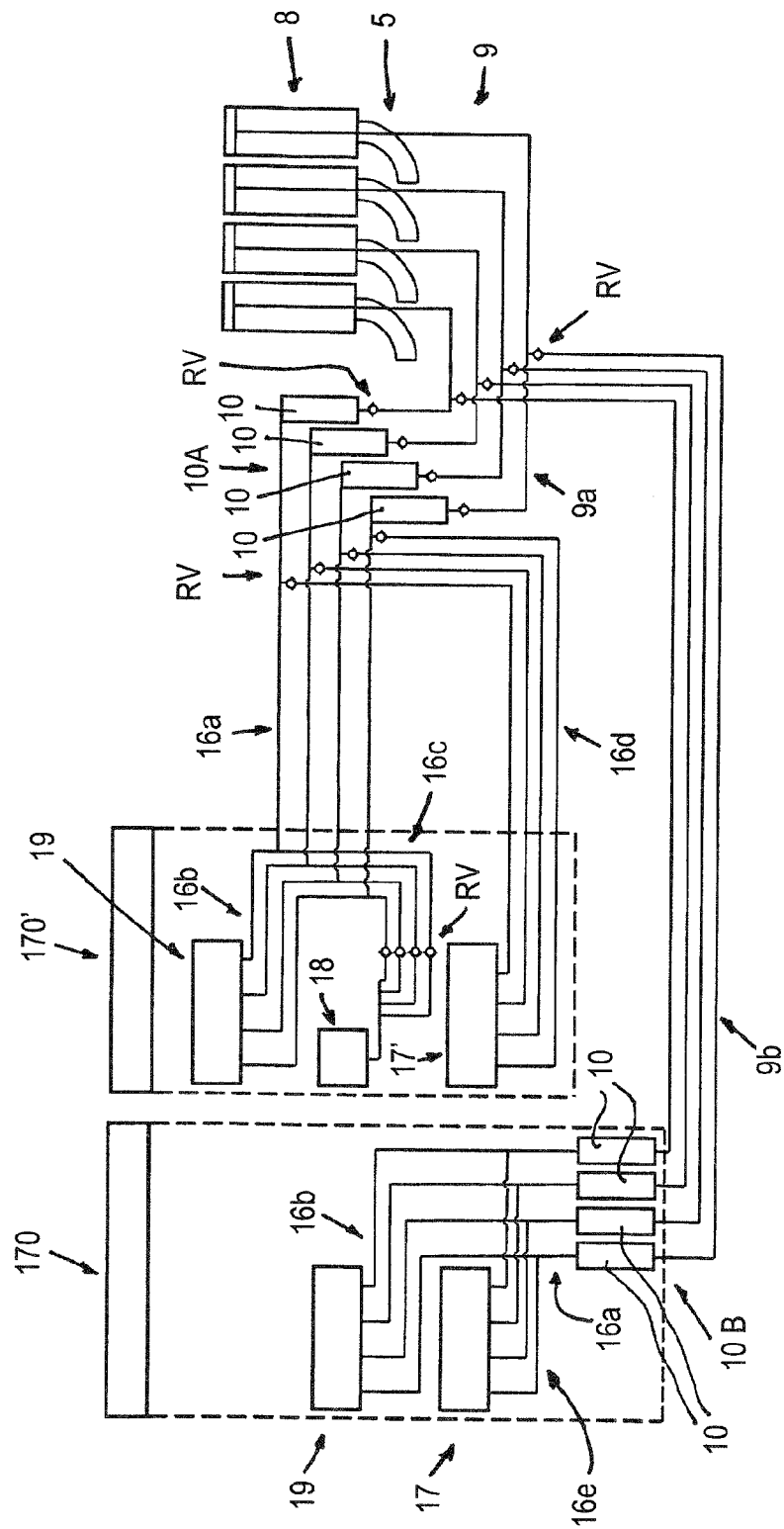
FIG. 2 shows safety valves according to the invention in a pre-dipping/post-dipping device, in a schematic block diagram.

A schematic illustration of an exemplary type of application of a safety valve 10 according to the invention, together with a safety valve device 1, is shown in FIG. 1. FIG. 2 shows safety valves 10 according to the invention in a pre-dipping/post-dipping device, in a schematic block diagram.

Two safety valve devices 1 of a milking installation for milking milk-providing animals, for example cows, are shown. Two safety valve devices 1 are provided for each teat of an udder of a milk-providing animal. The milking installation will not be discussed in more detail. A teat cup 8 to which one of the safety valve devices 1 is connected by way of a line 5 is shown in a representative manner for a milking tool of the milking installation. Furthermore, the teat cup 8 is connected by way of a further outgoing line 9 of a cleaning device (so-called pre-dipping/post-dipping devices). This cleaning device here is only schematically shown, having one of a plurality of safety valves 10 and supply units (pre-dipping supply 170 and post-dipping supply 170'). At least one safety valve 10 is provided here for each teat or teat cup 8, respectively.

A detailed description of the cleaning device and of the safety valve devices may be derived from documents US 2012/0017836 A1 and WO 2010/053577 A1.

The safety valve devices 1 serve for avoiding unintentional suctioning of undesirable media from a "substandard milk" line (presently a line 5b, for example) or from a "cleaning line" (presently the line 5, for example), respectively, into a "conforming milk" line (presently a line 5a, 5c, for example).

The safety valve devices 1 each comprise three individual valves 2, 3, and 4. The first valve 2 and the second valve 3 are also referred to as "block valves". Depending on the flow direction of the media flowing therethrough, the first valve 2 is referred to as the intake valve, and the second valve 3 is referred to as the outlet valve, or vice-versa. The third valve 4 is usually referred to as the "bleed valve". These three valves 2, 3, and 4 are interconnected in such a manner that the first valve 2 and the second valve 3 in terms of flow are in series, the third valve 4 being connected to a connection of the first valve 2 and of the second valve 3. The safety valve device 1, which is also referred to as the "block-bleed-block valve", is thus formed.

The first valve 2 of the first safety valve device 1 by way of a first connector 2a and by way of the line 5b is connected to a substandard-milk container 6. An outlet of the first valve 2 by way of the third valve 4 is connected to an intake of the second valve 3. The third valve has a connector 4a by way of which the connection of the first valve 2 to the third valve 3 is connectable to the atmosphere. The second valve 3 by way of the connector 3a thereof is connected to both the line 5 to the teat cup as well as to the line 5a to the second safety valve device 1. The second safety valve device 1 is of identical construction as the first safety valve device, and by way of the line 5c is connected to a "conforming-milk container" 7.

The safety valve devices 1 are impinged with a vacuum from a vacuum unit (not described in more detail here) in order to suction milk from the teat cup 8.

The safety valve 10 here is schematically illustrated, and has two block valves 11 and 12 and a bleed valve 13. The first block valve 11 by way of an intake and by way of an intake 110 and a line 16 is connected to the pre-dipping supply 170 or the post-dipping supply 170', respectively. Furthermore, an outlet of the first block valve 11 by way of a connection 14' is connected to an intake of the second block valve 12. An outlet of the second block valve 12 by way of an exhaust 120 is connected to the outgoing line 9 on the teat cup 8.

Moreover, the connection 14' communicates with an intake of the bleed valve 13 which by way of the outlet thereof is connected to a bleed outlet 130 of the safety valve 10.

This safety valve 10 also has a function of a block-bleed-block valve. If and when the block valves 11 and 12 are opened, the bleed valve 13 is closed. This position hereunder is referred to as the throughput position. In a so-called blocking position, the blocking valves 11 and 12 are closed, the bleed valve 13 being opened and connecting the bleed outlet 130 to the connection 14'. In this way it is ensured in the blocking position that the first block valve 11 completely blocks any throughput of media from the pre-dipping supply 170 or from the post-dipping supply 170', on the one hand, and the second block valve 12 closes off the connection to the teat cup 8 by way of the outgoing line 8, on the other hand. The throughput position is assumed in the case of cleaning procedures (pre-dipping, post-dipping), the blocking position being set during milking procedures. Moreover, the blocking position is always assumed as the safety position in the case of a non-activated drive of the safety valve 10.

It is moreover guaranteed in the blocking position that in the case of any potential leakage of the first block valve 11 (due to wear, for example), media from the pre-dipping supply 170 or from the post-dipping supply 170', respectively, cannot make its way into the suction line 5 of the safety valve device 1, since the connection 14' by way of the opened bleed valve 13 is connected to the bleed outlet 130 (for example into the atmosphere or into a suitable collection container).

In the case of any leakage of the second block valve 12 in the blocking position, no media may be suctioned by way of the exhaust line 9 from the pre-dipping supply 170 or from the post-dipping supply 170' by virtue of the opened bleed valve 5.

The safety valve 10 is yet to be described in more detail hereunder.

A potential arrangement of these safety valves in the context of pre-dipping/post-dipping supplies 170, 170' is shown in a schematic block diagram in FIG. 2.

Four teat cups 8 are in each case connected by way of an exhaust line 9 and 9a and by way of check valves RV to a first safety valve assembly 10A having four safety valves 10 which by way of intake lines 16a, 16b are connected to a post-dipping supply 170'. Moreover, a second safety valve assembly 10B of four safety valves 10 by way of further exhaust lines 9b and by way of check valves RV are connected to the exhaust lines 9 to the teat cups 8. The second safety valve assembly 10B is presently a component part of the pre-dipping supply 170. The check valves RV enable a directed flow of the media into the exhaust lines 9, thereby preventing any backflow.

The pre-dipping supply delivers a pre-dipping medium from a pre-dipping medium source 17 through intake lines 16e. Moreover, filtered purging air from a purging air source 19 is provided in intake lines 16b.

In the post-dipping supply, the supply of post-dipping medium from a post-dipping medium source 17' is performed by way of the intake lines 16d. Water from a water source 18 is provided through the intake lines 16c. Here too, there is a purging air supply 19 for filtered purging air which is delivered in intake lines 16b.

This comprises, for example, iodine, hexidine compounds, or the like. 150 ml of pre-dipping medium or post-dipping medium, respectively, are required per teat, for example.

All sources 17, 17', 18, 19 deliver the media provided therefrom at a specified pressure. Therefore, the safety valves 10 are impinged with this pressure, but not with any negative pressure or a vacuum, respectively. Moreover, the safety valves 10 do not carry out any metering functions.

Figure 3:
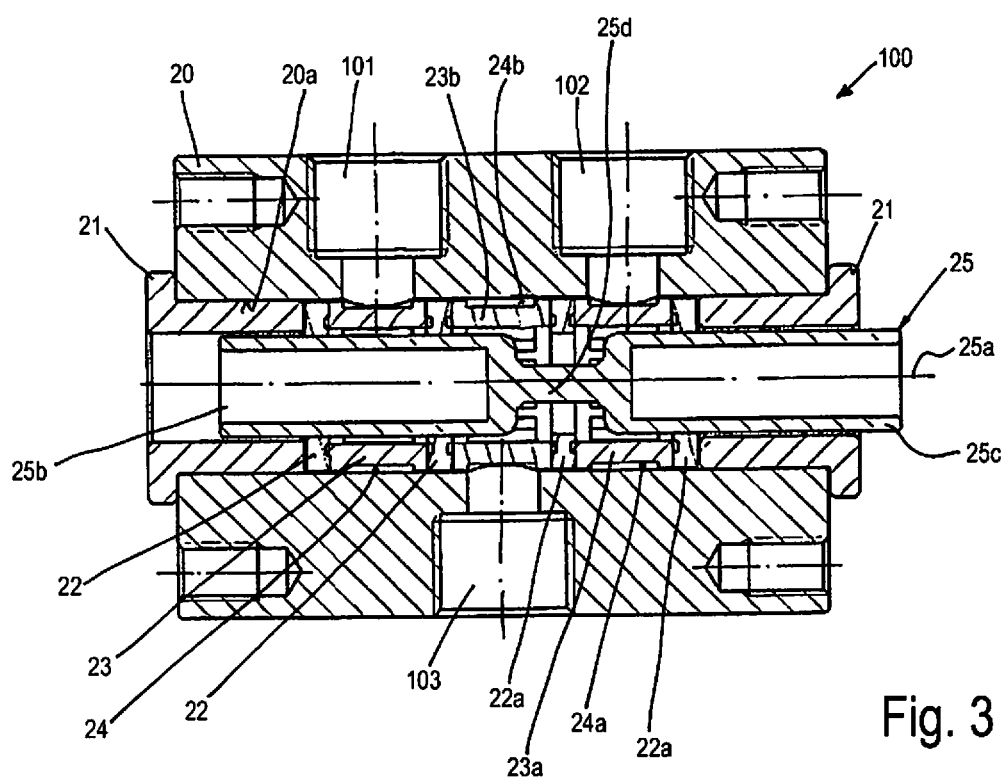
FIGS. 3-3c show schematic sectional views and circuit diagrams of a regular directional valve, in various switched positions.
Figure 3A:
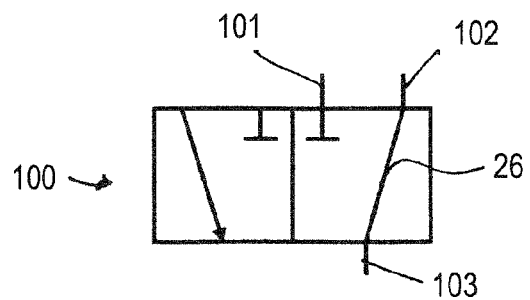
Figure 3C:
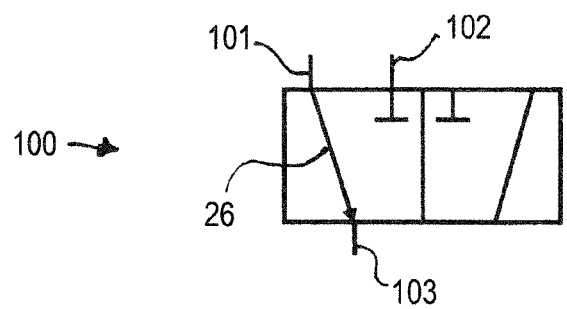
Figure 5:
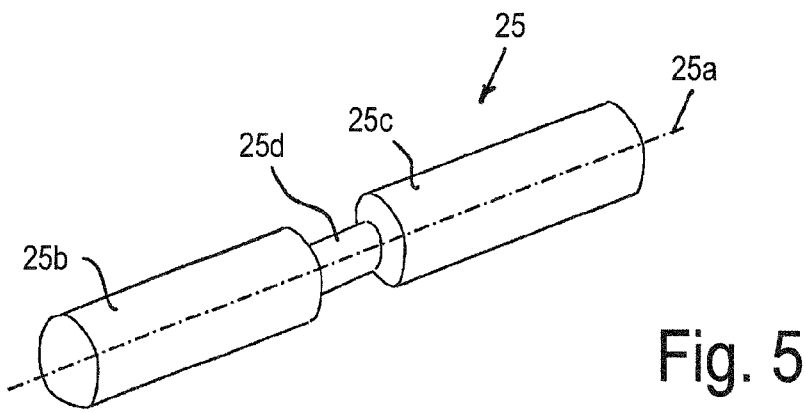
FIG. 5 shows a schematic perspective view of a regular piston.

Schematic sectional views and circuit diagrams of a regular directional valve 100 in various switched positions are shown in FIGS. 3-3c. Complementary thereto, FIG. 5 illustrates a schematic perspective view of a regular piston 25.

Figure 3B:
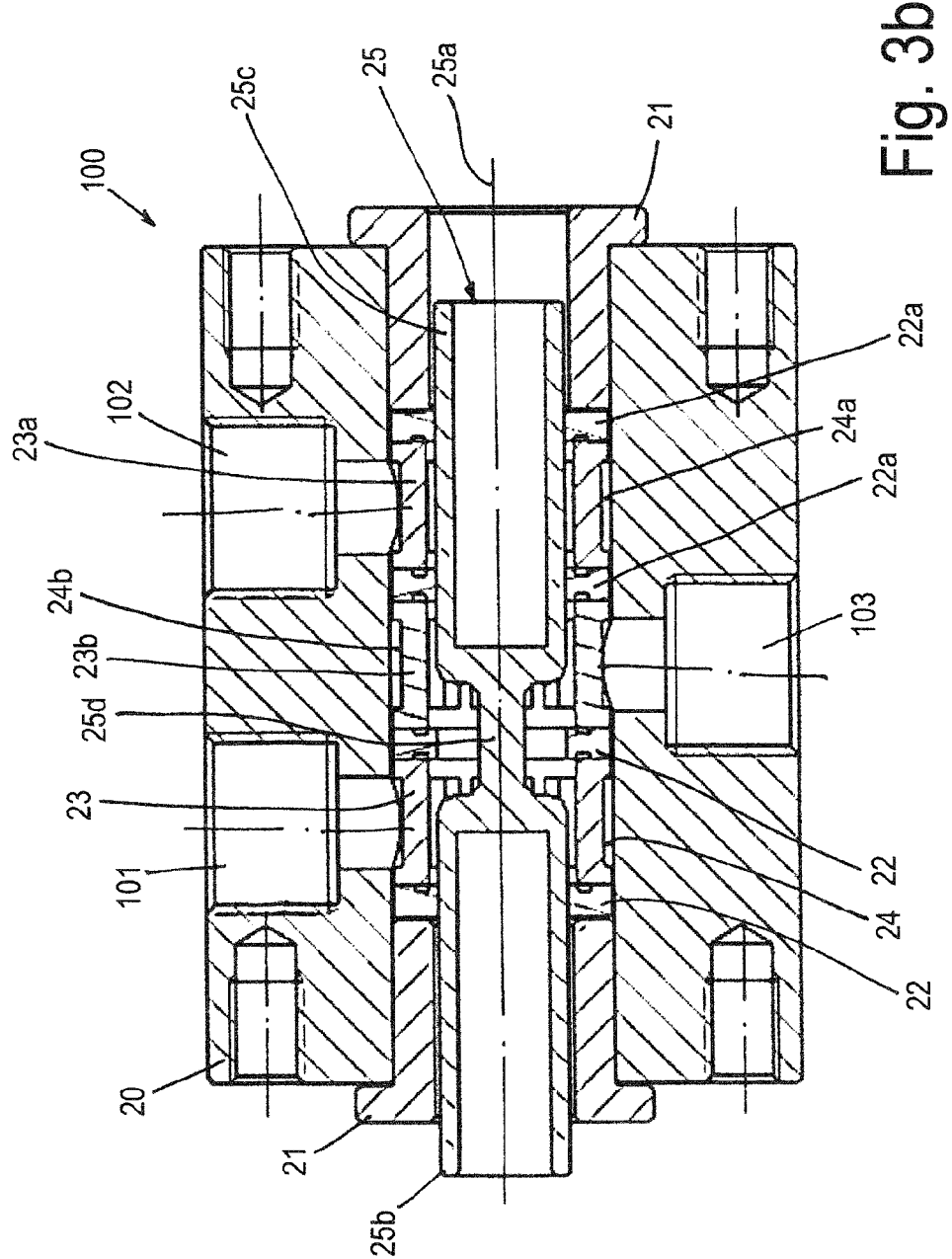

FIG. 3 here shows the directional valve 100 in a first switched position, FIG. 3a providing the associated circuit diagram. A further second switched position of the directional valve 100 is illustrated in FIG. 3b, together with the associated circuit diagram in FIG. 3c.

The directional valve 100 is a so-called 3/2-way valve having a valve body 20. The valve body 20 has a continuous circular-cylindrical internal bore 20a, two perpendicular bores which are disposed so as to be spaced apart extending thereinto from above. The left bore forms a connector 101, the right bore forming a further connector 102. A third bore is molded from below through the valve body 20 into the internal bore 20, forming a third connector 103.

The following components are disposed in the internal bore 20a of the valve body 20 (from left to right in the drawing): a mounting flange 21, a seal 22, a spacer 23, a further seal 22, a spacer 23b, a seal 22a, a spacer 23a, a seal 22a, and a further mounting flange 21. The seals 22-22a by way of the external diameter thereof simultaneously (statically) seal the wall of the internal bore 20a and by way of the internal diameter thereof seal portions of a piston 25. The piston 25 is linearly traversable in the direction of the longitudinal axis 25a thereof. Said piston 25 has two circular-cylindrical body portions 25b, 25c, an annular depression having a connection portion 25d being interdisposed therebetween and being connected to the body portions 25b, 25c.

The spacer 23 is disposed in the region of the first connector 101, the spacer 23a being disposed in the region of the second connector 102, and the spacer 23b being disposed in the region of the third connector 103. The spacers 23, 23a, 23b may be integral or in multiple parts. Variants in which instead of each seal 22-22a having a double seal in each case one seal for the wall of the internal bore 20a, and one seal for the piston 25 is provided (for example O-rings), are also possible.

A space 24 is defined between the seals 22 and the interdisposed spacer 23. In the case of the seals 22a having the spacer 23a, a space 24a is also defined. A third space 24b is formed by the mutually opposite seals 22, 22a having the interdisposed spacer 24b.

By way of linear adjustment of the piston 25 by means of a drive which is not shown but is readily adjustable, by way of positioning of the annular depression 25d thereof, in the first switched position as per FIG. 3 the second connector 102 is connected to the third connector 103, and in the second switched position as per FIG. 3b the first connector 101 is connected to the third connector 103. The respective connection by way of the annular depression 25d is stated in the associated circuit diagram as per FIGS. 3a and 3c as the connection 26.

In the first switched position as per FIG. 3, the spaces 24a and 24b communicate in this manner by way of the annular depression 25d of the piston 25. The space 24 by virtue of the body portion 25b of the piston 25 is closed, on account of which the connector 101 is closed off. In the second switched position as per FIG. 3b, the spaces 24 and 24b now communicate by way of the annular depression 25d of the piston 25. Here, the space 24a by virtue of the body portion 25c of the piston 25 is closed, on account of which the connector 102 is closed off.

The safety valve 10 according to the invention will now be described in the context of FIGS. 4-4c and 5.

Figure 4A:
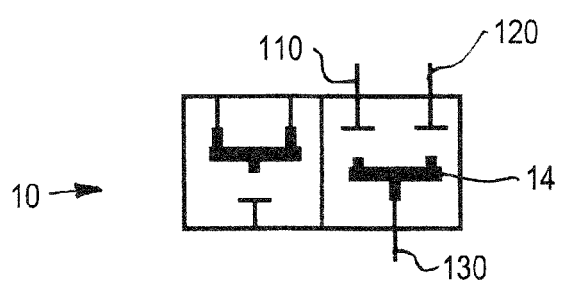
FIGS. 4-4c show schematic sectional views and circuit diagrams of a first exemplary embodiment of the safety valve according to the invention, in various switched positions.
Figure 4C:
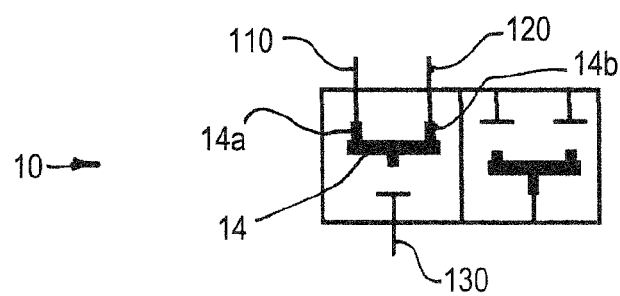
Figure 4:
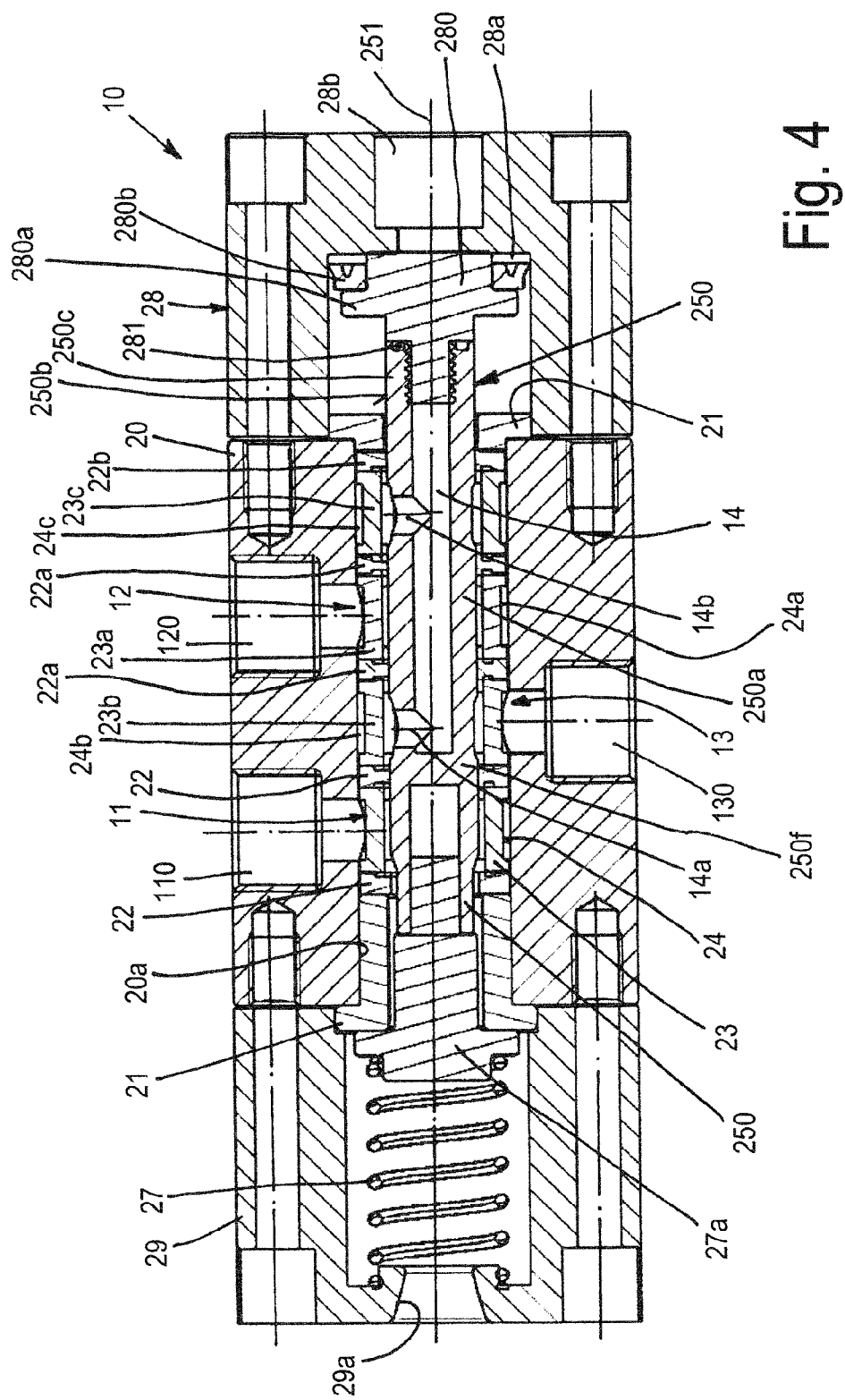
Figure 6:
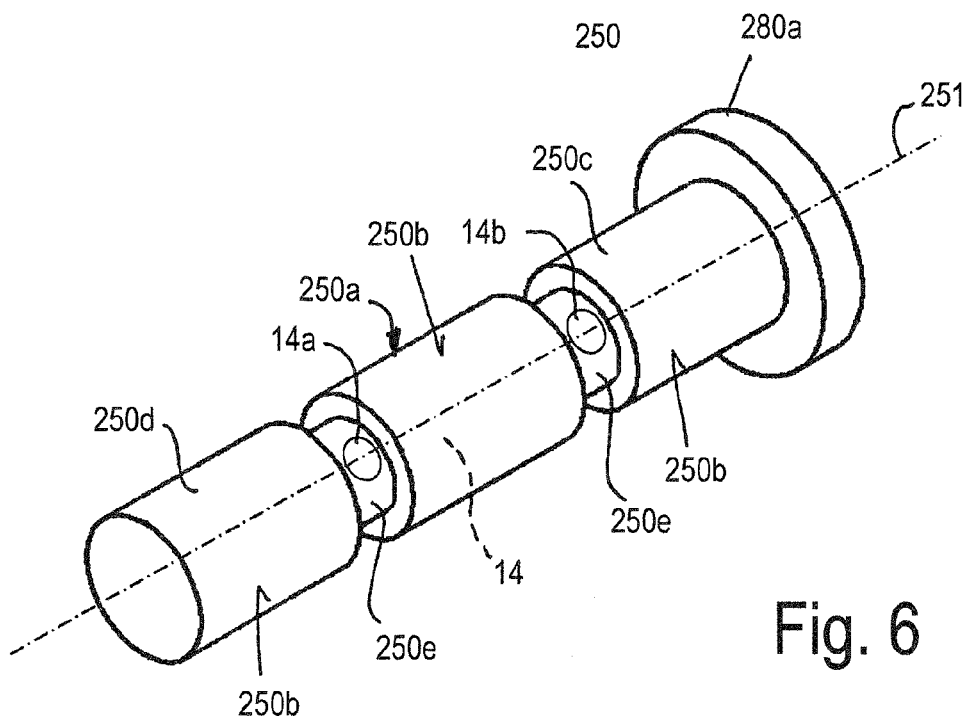
FIG. 6 shows a schematic perspective view of a hollow piston.

FIGS. 4-4c show schematic sectional views and circuit diagrams of a first exemplary embodiment of the safety valve 10 according to the invention, in various switched positions. FIG. 6 is a schematic perspective view of a hollow piston 250.

The safety valve 10 according to the invention in this first exemplary embodiment comprises the valve body 20 of a regular 3/2-way valve 100, having the circular-cylindrical internal bore 20a.

As opposed to the regular 3/2-way valve 100, the safety valve 10 according to the invention is equipped with a hollow piston 250 which will yet be explained in detail hereunder, on account of which the functioning of the three bores is likewise different. The upper left bore in the drawing forms the intake 110 of the first block valve 11, the upper right bore forms the exhaust 120 of the second block valve 12, and the lower bore forms the bleed outlet 130 of the bleed valve 13.

In the blocking position of the safety valve 10, the intake 110 and the exhaust 120, due to the closure of each associated block valve 11, 12 by way of the hollow piston 250, are both simultaneously closed off. Moreover, the bleed outlet 130 together with the associated bleed valve 13, by virtue of the position of the hollow piston 250, communicates with the cavity 14 of the hollow piston 250. This will yet be explained in more detail hereunder.

Figure 4B:
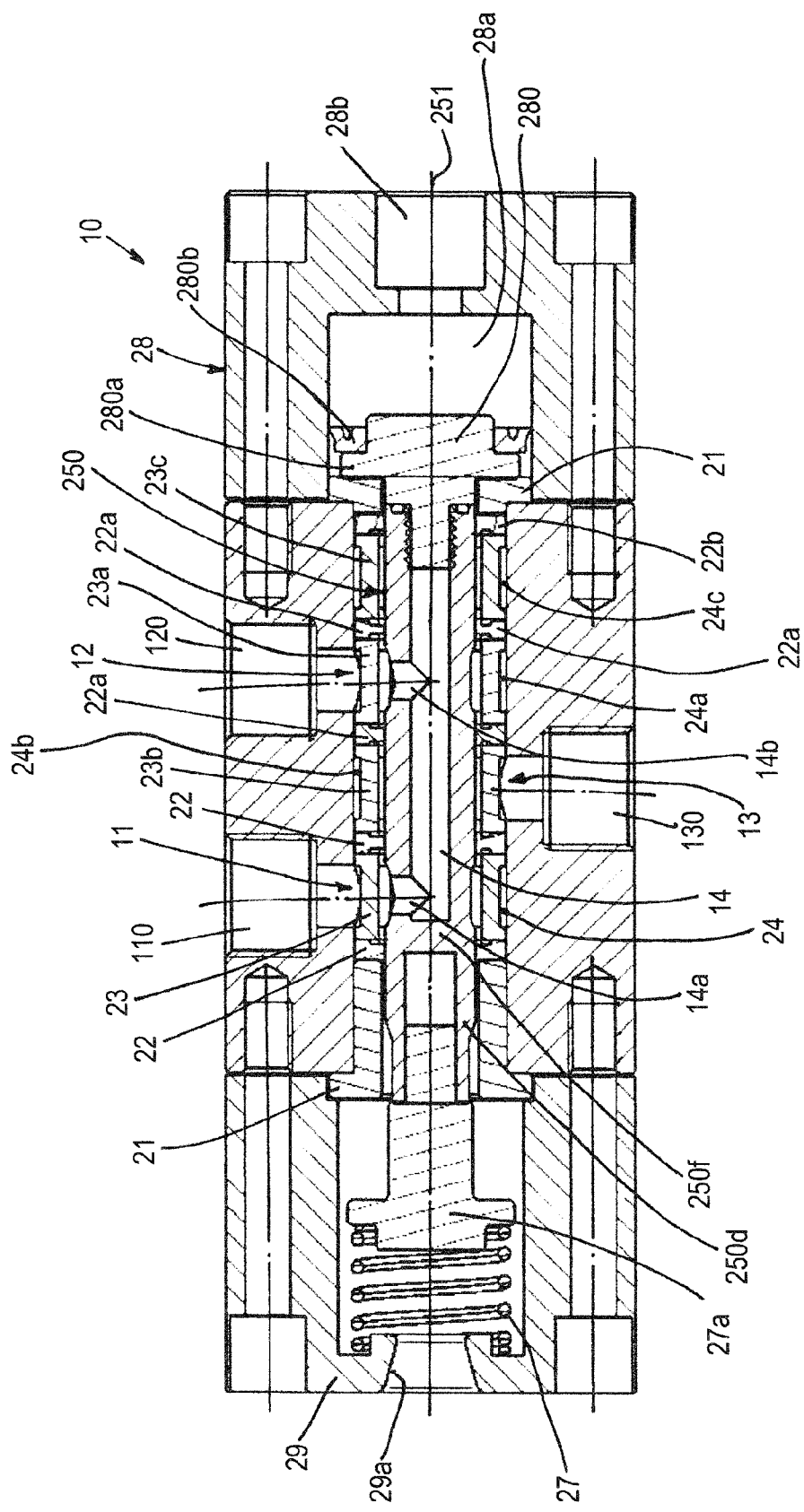

In the throughput position of the safety valve 10 according to FIGS. 4b, 4c, the intake 110 of the first block valve 11 and the exhaust 120 of the second block valve 12 intercommunicate by way of the cavity 14 of the hollow piston 250 such that a pressurized media may flow from the intake 110 through the cavity 14 of the hollow piston 250 into the exhaust (or else vice-versa, depending on the connection). In other words, the block valves 11 and 12 are opened and connected by the position of the hollow piston 250 and the cavity 14 thereof. The bleed outlet 130 of the bleed valve 13 is simultaneously closed off by the position of the hollow piston 250. This position will yet be described in detail hereunder.

The following components are disposed in the internal bore 20a of the valve body 20 (from left to right in the drawing): a mounting flange 21, a seal 22, a spacer 23, a further seal 22, a spacer 23b, a seal 22a, a spacer 23a, a seal 22a. A further spacer 23c and a further seal 22b are additionally provided in front of the further mounting flange 21. The seals 22-22a by way of the external diameter thereof simultaneously (statically) seal the wall of the internal bore 20a and by way of the internal diameter thereof seal portions of the hollow piston 250.

A space 24 is defined between the seals 22 having the interdisposed spacer 23, the seals 22a by way of the spacer 23a defining the space 24a. The third space 24b is formed by the mutually opposite seals 22, 22a having the interdisposed spacer 24b. A fourth space 24c is furthermore formed by the mutually opposite seals 22a, 22b having the interdisposed spacer 23c. In this manner, the space 24 may be assigned to the first block valve 11 having the intake 110, the space 24a may be assigned to the second block valve 12 having the exhaust 120, and the space 24b may be assigned to the bleed valve 13 having the bleed outlet 130.

The hollow piston 250 is disposed in the internal bore 20a of the valve body 20 so as to be longitudinally traversable, having a body 250a with a surface 250b. An end of the hollow piston 250 that is disposed on the right in the drawing is referred to as the drive end 250c and is connected to a drive element 280 which will yet be described hereunder. The drive end 250c by way of the right mounting flange 21 is guided so as to be longitudinally traversable. The other end, i.e. the left end, of the hollow piston 250 has an end portion 250d having a cylindrical recess which forms a receptacle for a mount 27a which extends to the left into a space of the cover 29, forming a bearing for a force accumulator element 27 which here is supported on an internal side of the cover 29 and will yet be explained hereunder. The cover 29 is attached to the left side of the valve body 20 by fastening elements, for example screws. A right part of the mount 27a is guided in the left mounting flange 21 so as to be longitudinally traversable.

The hollow piston is moreover provided with a cavity 14 which extends from the drive end 250b in the direction of the longitudinal piston axis 251 to a wall 250f. The wall 250f forms a bulkhead between the receptacle for the mount 27a and the cavity 14. The cavity 14 has two openings 14a and 14b, each extending in the radial direction and each opening into an intermediate portion 250e. These intermediate portions 250e are spaced apart in the direction of the longitudinal piston axis 251, being molded in the surface 250b of the hollow piston 250. This can be seen clearly in FIG. 6.

The first opening 14a (disposed to the left in the figures) is assigned to the first block valve 11, the other opening 14b being assigned to the second block valve 12. The cavity 14, from the side of the drive end 250c, is tightly closed off by a portion of the drive element 280, to which end a seal 281, for example an O-ring, is provided between this portion and the internal wall of the cavity 14. The drive element 280 is a type of circular-cylindrical body which on that end thereof that faces away from the hollow piston 250 has a drive piston 280a having a drive-piston seal 280b. The drive piston 280a is guided in a circular-cylindrical cubic capacity 28a of a drive unit 28 so as to be longitudinally traversable in the direction of the longitudinal piston axis 251 of the hollow piston 250. The drive unit 28 is fastened onto the right end face of the valve body 20 of the safety valve 10, encompassing an external flange of the mounting flange 21. The cubic capacity 28a by way of a drive connector 28b to the right, in front of the drive piston 280a, is impingeable with a drive medium, for example compressed air.

A cover 29 spanning the external flange of the mounting flange 21 is fastened to the other, i.e. the left, end face of the valve body 20. The cover 29 has an opening 29a for ventilation in the case of movement of the hollow piston 250 and forms a counter bearing for the force accumulator element 27, presently a compression spring, which is inserted in a pre-tensioned state between the internal side of the cover 29 and the receptacle in the end portion 250d of the hollow piston 250. By virtue of the pre-tensioning of the force accumulator element 27, which acts in the direction of the longitudinal piston axis 251 in the direction toward the drive unit 28, the hollow piston 250 is urged into the blocking position of the safety valve 10, as is shown in FIG. 4. Here, the right end of the drive element 280 by way of the internal end-face side of the cubic capacity 28a of the drive unit 28 may form a stop for the hollow piston 250 in the blocking position.

Activation of the drive unit 28 by impinging the cubic capacity 28a to the right of the drive piston 280a causes an adjustment of the hollow piston 250 to the left, counter to the pre-tensioning force of the force accumulator element 27, to the throughput position of the safety valve 10, which is illustrated in FIG. 4c. The left end of the end portion 250d of the hollow piston 250 interacts with the internal side of the cover 29, forming a stop for the movement of the hollow piston 250 in the throughput position.

In the blocking position shown in FIG. 4, the end portion 250d of the hollow piston 250 by way of the continuous surface 250b thereof is located in the region of the intake 110, sealing the space 24. That is to say that the seals 22 seal the internal bore 20a and the region of the end portion 250d. The space 24 is thus closed off, being equivalent to the first blocking valve 11 and thus the intake 110 being closed off. The same state is present in the case of the second block valve 12. Here, the surface 250b of the body 250a of the hollow piston 250, together with the associated seals 22a, seals the space 24a. The second block valve 12 and the intake 120 are thus closed off.

In the blocking position shown in FIG. 4, the first opening 14a of the cavity 14 of the hollow piston 250 communicates with the space 24b which is sealed by the seals 22 and 22a. The second opening 14b is connected to the space 24c between the seals 22a and 22b. The space 24b, as part of the bleed valve 13, simultaneously communicates with the bleed outlet 130. In other words, the bleed outlet 130 by way of the space 24b and the first opening 14a is connected to the cavity 14 and the space 24c. The bleed valve 13 in the blocking position of the safety valve 10 is thus opened. In the case of any leakage of the first block valve 11, the medium escaping on account thereof is discharged on the right side by way of the space 24b into the bleed valve 13, and cannot make its way into the closed-off exhaust 12. On the left side of the first block valve 11, the medium would make its way from the intake 110 into the region of the force accumulator element 27, being able to exit through the opening 29a. Both sides of the block valve 12, that is to say the spaces 24b and 24c, are connected as described above to the opened bleed valve 13 and to the bleed outlet 130.

The circuit diagram in FIG. 4a symbolically shows the cavity 14 in the blocking position, being connected to the bleed outlet 130. The intake 110 and the exhaust 120 are closed off.

In the throughput position shown in FIG. 4b, the central portion of the body 250a of the hollow piston 250, by way of the continuous surface 250b thereof, is located in the region of the bleed outlet 130, sealing the space 24b by way of the seals 22 and 22a. This means that the space 24b is closed off, this being equivalent to the bleed valve 13 and the bleed outlet 130 being closed off in the throughput position of the safety valve 10.

In the throughput position shown in FIG. 4b, the first opening 14a of the cavity 14 of the hollow piston 250 communicates with the space 24 which is sealed by the seals 22. The second opening 14b is connected to the space 24a between the seals 22a. In other words, the intake 110 by way of the space 24 and by way of the opening 14a is connected to the cavity 14 of the hollow piston 250. The second opening 14b simultaneously communicates with the cavity 14 of the hollow piston 250 and the space 24a having the exhaust 120. In this manner, the block valves 11 and 12 are opened, connecting the intake 110 to the exhaust 120.

The throughput position in FIG. 4c is visualized by a circuit diagram, wherein the cavity 14 by way of the first opening 14a is connected to the intake 110, and by way of the second opening 14b is connected to the exhaust 120. The bleed outlet 130 is closed off.

Figure 7:
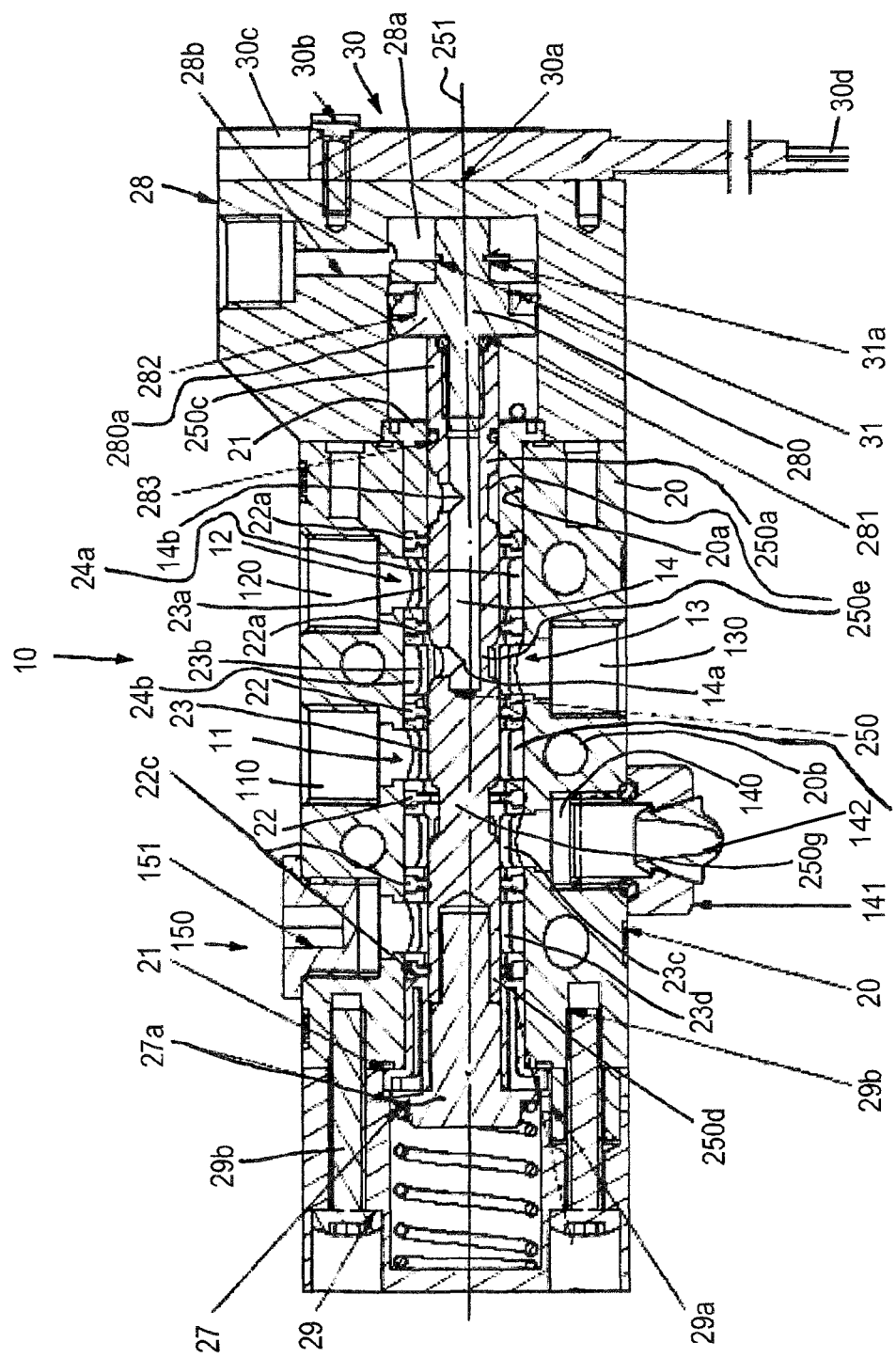
FIG. 7 shows a schematic sectional view of a second exemplary embodiment of the safety valve according to the invention.

FIG. 7 shows a schematic sectional view of a second exemplary embodiment of the safety valve 10 according to the invention.

As opposed to the safety valve 10 shown in FIGS. 4-4c, the housing of a regular 5/2-way valve is applied here, a hollow piston 250 having the cavity 14 being likewise provided here. The hollow piston 250 on the left side thereof is extended in the longitudinal piston direction 251, having a constriction 250g.

The body 250a of the hollow piston 250 is guided in the right mounting flange 21 so as to be longitudinally traversable in the direction of the longitudinal piston axis 251, and in relation to the mounting flange 21 is sealed by a seal 281.

A mount 27a which extends toward the left into a space of the cover 29, forming a bearing for the force accumulator element 27 which also here is supported on an internal side of the cover 29 is disposed in the receptacle of the end portion 250d. The cover 29 is fastened to the left side of the valve body 20, using fastening elements 29b, for example screws.

The following components are disposed in the internal bore 20a of the valve body 20 (from left to right in the drawing): a mounting flange 21, a seal 22c, a spacer 23d, a seal 22c, a spacer 23c, a seal 22, a spacer 23, a further seal 22, a spacer 23b, a seal 22a, a spacer 23a, a seal 22a. Seals 22-22b and associated spaces 24-24b of the valves 11, 12, and 13 are as described above in the first exemplary embodiment as per FIGS. 4-4c.

A first additional connector 140 is disposed at the bottom left, so as to be beside the connector 130, a second additional connector 150 being provided at the top left, so as to be beside the intake 110. This second additional connector 150 is completely closed off by a closure element 151. The first additional connector 140 is provided with a closure element 141 which has a small opening.

The blocking position shown in FIG. 7 in terms of the valves 11, 12, 13 has already been explained in the first exemplary embodiment and is not repeated at this point.

Figure 7A:
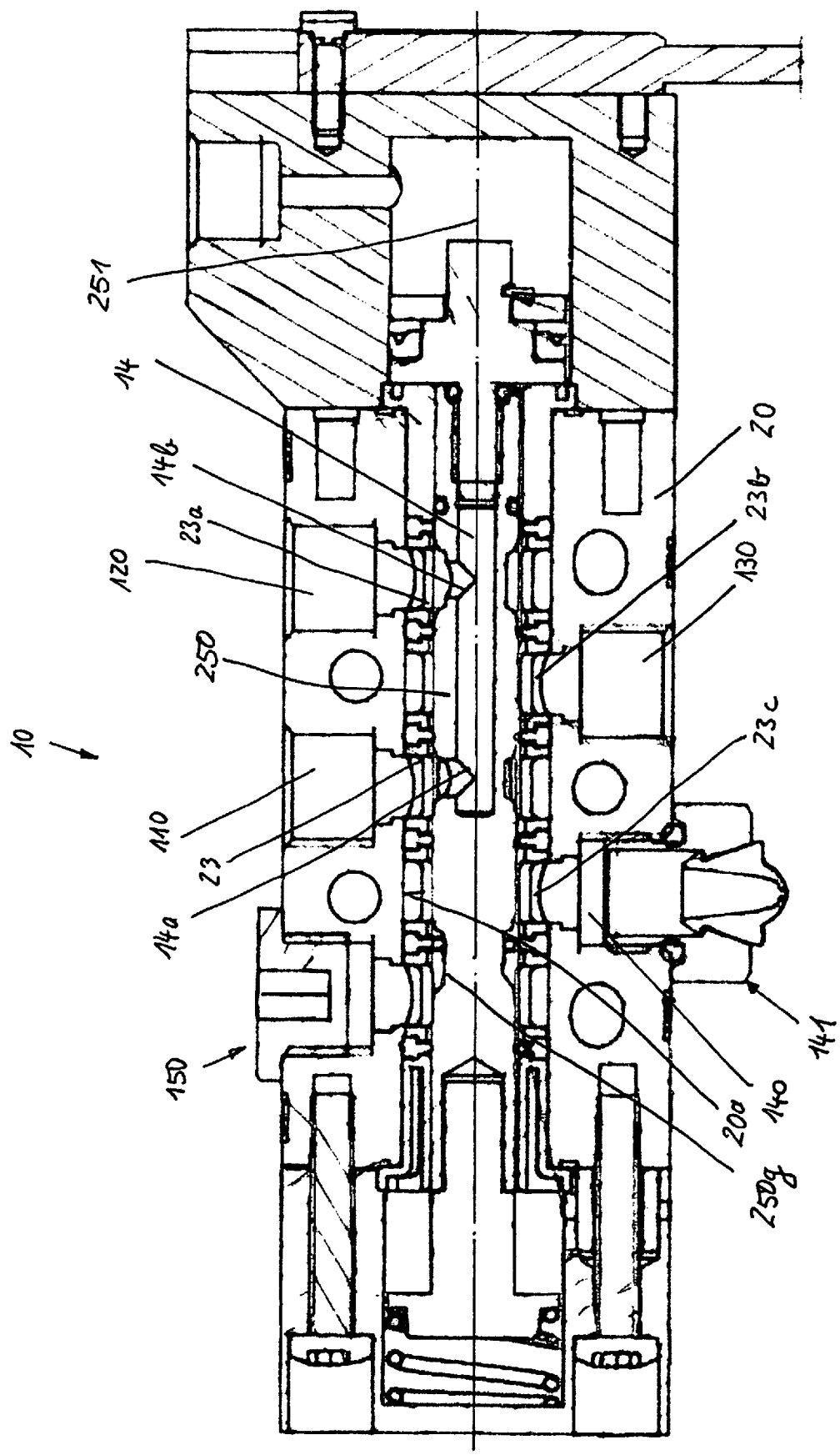
FIG. 7a shows a schematic sectional view of the second exemplary embodiment of the safety valve according to the invention.

The first additional connector 140 in the blocking position by way of the constriction 250g of the hollow piston 250 is connected to the intake 110, on account of which ventilation of the intake 110 may be achieved. In this way, a volumetric flow for avoiding an undesirable flow of milk into the dipping hose or into the exhaust line 9 of the dipping medium, respectively, is enabled. A further advantage lies in that a so-called headspace volume at the teat head may be reduced. In the throughput position, which is shown in FIG. 7a, the first additional connector 140 by way of the constriction 250g of the hollow piston 250 is connected to the closed-off second additional connector 150.

It is shown in this second exemplary embodiment that the drive element 280 has the drive piston 280a having a seal 282 which seals the drive piston 280a in relation to the cubic capacity 28a. The drive element 280 together with the seal 281 is tightly incorporated into the drive end 250c of the hollow piston 250, sealing the cubic capacity 28a. The drive connector 28b here is disposed in a radial manner.

The safety valve 10 moreover has a sensor unit 30 which comprises a sensor element 30a having a sensor line 30d, a sensor fastening 30b, for example a screw, and a sensor mount 30c. The sensor mount 30c is fastened to the right lateral end of the drive unit 28 such that the sensor element 30a is disposed in the region of the right end of the drive element 280. The sensor element 30a here interacts with a magnetic element 31, for example, which by way of a securing element 31a is fixed to the right end of the drive element 280. The sensor element 30a may be a Hall-effect element, for example. Of course, other sensor embodiments, for example ultrasonic sensors, infrared sensors, etc., may also be applied.

By way of the sensor unit 30 it is possible for the linear positioning of the hollow piston 250 in the longitudinal piston axis 251 thereof to be detectable. The blocking position shown in FIG. 7 is thus acquirable in a non-contacting manner, enabling errors to be identified.

The valve body 20 has a plurality of fastening openings 20b which perpendicularly to the drawing plane extend through the valve body 20.

Figure 8:
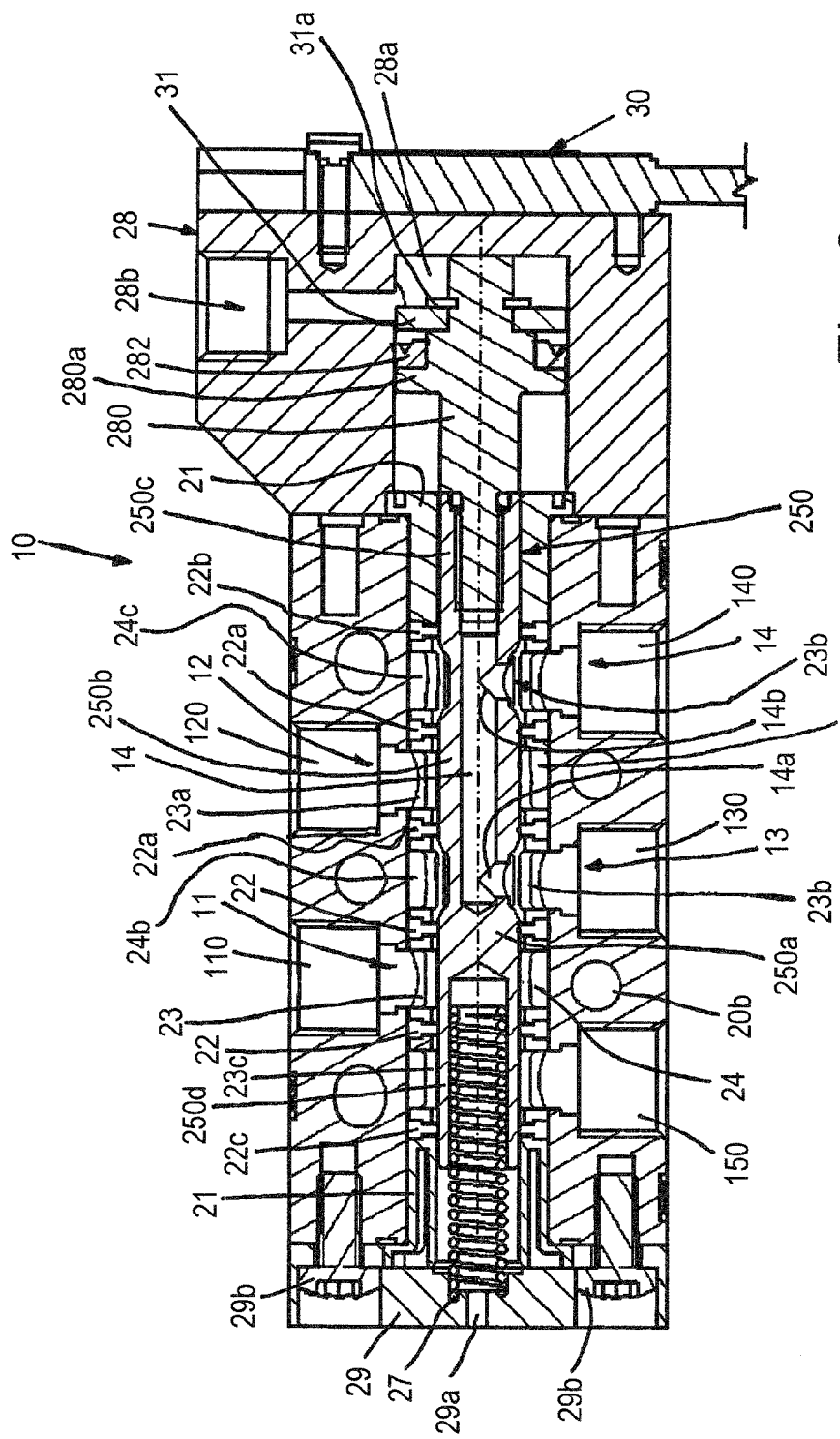
FIGS. 8-8a show schematic sectional views of a variant of the second exemplary embodiment as per FIG. 7, in various switched positions.
Figure 8A:
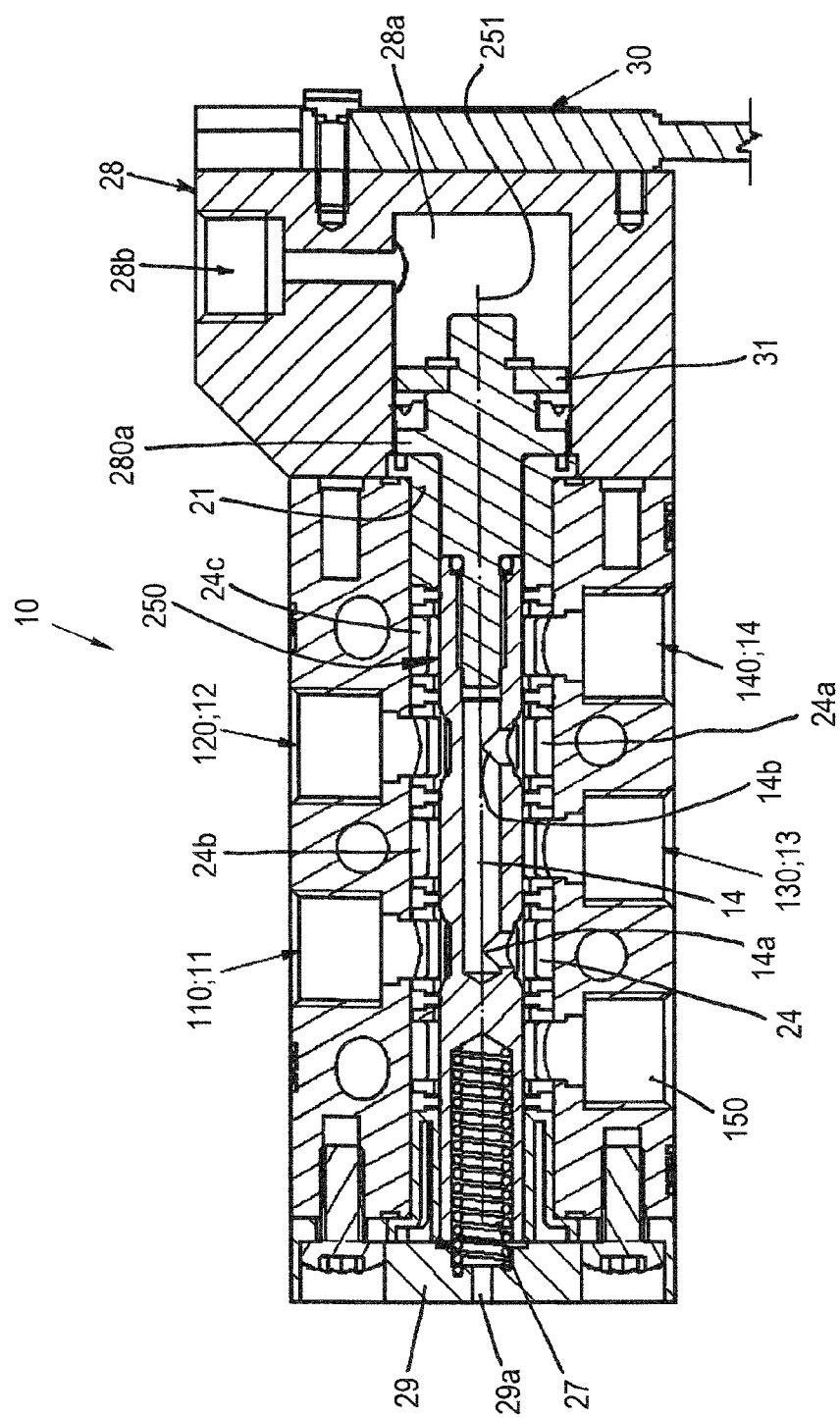

FIGS. 8 and 8a show schematic sectional views of a variant of the second exemplary embodiment as per FIG. 7, in various switched positions. In this way, FIG. 8a shows the throughput-position of the safety valve 10, FIG. 8 illustrating the blocking-position.

The construction of this variant is similar to that of the second exemplary embodiment. Only the points of difference are to be explained in this context.

In this case, the intake 110 and the exhaust 120 are disposed on the upper side of the valve body 20, the bleed outlet 130 being disposed therebetween on the lower side. To the right of the bleed outlet 130, toward the drive side, the first additional connector 140 having a valve 14 is provided. The second additional connector 150 is located to the left of the bleed outlet 130.

In this variant, the following components are disposed in the internal bore 20a of the valve body 20 (from left to right in the drawing): a mounting flange 21, a seal 22c, a spacer 23c, a seal 22, a spacer 23, a further seal 22, a spacer 23b, a seal 22a, a spacer 23a, a seal 22a, a spacer 23b, and a seal 22b. Seals 22-22b and associated spaces 24-24b of the valves 11, 12, and 13 are as described above in the first exemplary embodiment as per FIGS. 4-4c.

The cavity 14 of the hollow piston 250, in the blocking position shown in FIG. 8, by way of the first opening 14a of the cavity 14 of the hollow piston 250 is connected to the valve 13 and to the bleed outlet 130. Additionally, the second opening 14b of the cavity 14 of the hollow piston 250 is connected to the valve 14 and to the first additional connector 140. In this manner it is possible for the cavity 14 to be able to be purged using a cleaning medium (or else air).

As can be readily seen, the additional connectors 140 and 150 are closed off in the throughput position shown in FIG. 8a. Here, the second additional connector 150 may protect the force accumulator element 27 against the ingress of media in the case of any leakage of the intake 110, on account of which corrosion of the force accumulator element 27 may be prevented.

The safety valve 10 may be produced from a plastics material, the seals having to be resistant to the media used. To this end, a fluororubber material (Viton, for example) may be employed. The hollow piston 250 is manufactured from stainless steel.

Figure 9:
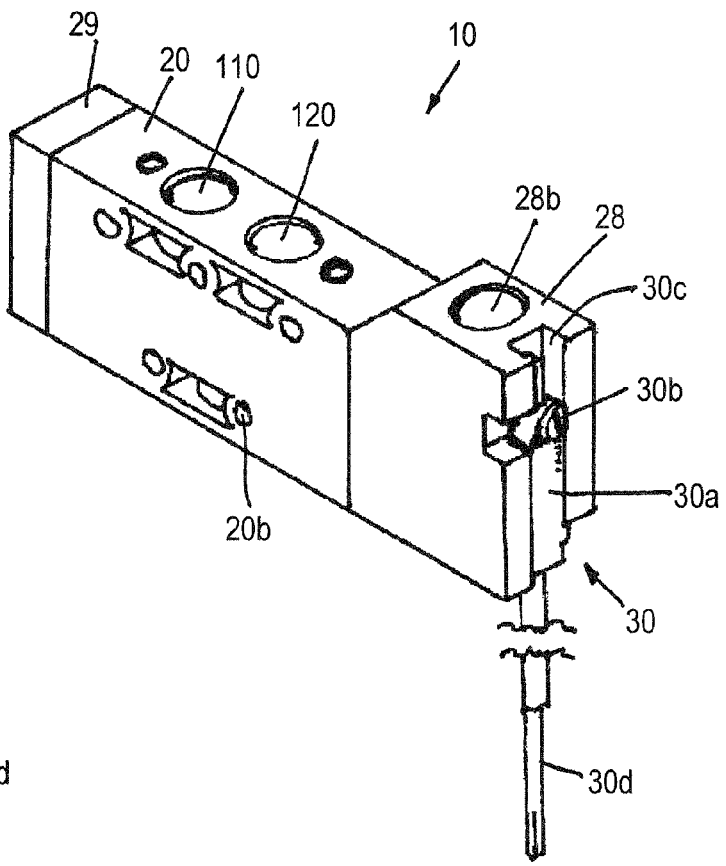
Figure 9A:
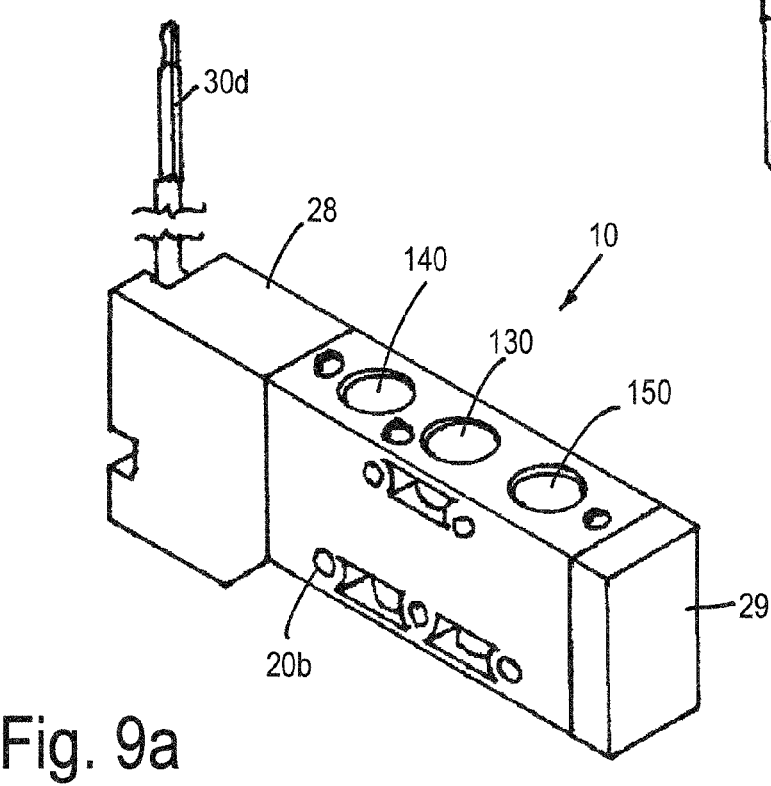

FIGS. 9 and 9a illustrate schematic perspective views of the variant of the second exemplary embodiment as per FIGS. 8-8a.

An upper side of the safety valve 10 is shown in FIG. 9, the lower side being shown in FIG. 9a. The safety valve 10 is extremely narrow, occupying only a small installation space. A plurality of safety valves 10 may be readily grouped together to form a safety valve assembly 10A, 10B by means of the fastening openings 20b. The sensor unit 30 can furthermore be seen. Here, commercially available sensor elements 30 in a simple manner may be inserted into the sensor mounting 30c, trimmed therein, and be fixed by means of the sensor fastening 30b.

The hollow piston 250 is manufactured from a material which is resistant to the media which come into contact with the hollow piston 250. This material may be a type of stainless steel and/or a plastics material, for example. Of course, combinations of various materials are also possible.

The exemplary embodiments described here above do not limit the invention. The invention is modifiable within the scope of the appended claims.

It is also conceivable for the spacers 23-23d having the associated seals 22-22c to be manufactured as bi-component injection-molded parts.

The closure element 141 of the additional connector 140 may be a nozzle 142 or be equipped with a nozzle 142, the exit cross section of the nozzle 142 being substantially smaller than the cross section of the additional connector 140.

The invention claimed is:

1. A dairy installation safety valve comprising:
    a valve body defining a bore, an intake in communication with the bore, an exhaust in communication with the bore, and a bleed opening in communication with the bore, and an additional opening in communication with the bore;
    a first spacer disposed in the bore and in communication with the intake;
    a second spacer disposed in the bore and in communication with the exhaust, and the second spacer is sealed from the first spacer;
    a third spacer disposed in the bore and in communication with the bleed opening, and the third spacer is sealed from the first spacer and the second spacer;
    a fourth spacer disposed in the bore and in communication with the additional opening and is sealed from the first spacer, the second spacer, and the third spacer; and
    a piston slidably disposed in: the bore, the first spacer, the second spacer, the third spacer; and the fourth spacer for movement between a blocking position and a throughput position; and
        the piston defines a cavity, a first opening, and a second opening; and
            in the throughput position the first opening is in communication with the intake and the cavity and the second opening is in communication with the exhaust, the cavity, and the first opening, and the bleed opening is closed, and the additional opening is closed; and
in the blocking position, the first opening is in communication with the third spacer and the cavity and the bleed opening and the second opening is in communication with the fourth spacer and the cavity and the additional opening.

2. The safety valve of claim 1, wherein the first opening is in communication with the second opening via the cavity.

3. The safety valve of claim 1, wherein the cavity extends in the direction of a longitudinal piston axis of the piston.

4. The safety valve of claim 1, wherein the intake and the exhaust are closed by the piston, the bleed opening is in communication with the cavity of the piston in the blocking position.

5. The safety valve of claim 1, wherein in the throughput position the first opening communicates with the cavity of the piston, and the second opening communicates with the cavity of the piston to connect the intake to the exhaust, and the bleed opening is closed by the piston.

6. The safety valve of claim 1, and further comprising:
a drive element engaged with the piston, to slide the piston between the blocking position and the throughput position.

7. The safety valve of claim 1, wherein the safety valve further comprises:
a pretensioned force accumulator that pretensions the piston to the blocking position.

8. The safety valve of claim 1, and further comprising:
a sensor unit disposed to detect the position of the piston.

9. The safety valve of claim 1, and further comprising:
a drive element operatively engaged with the piston; and
a sensor unit disposed to detect the position of the drive element.

10. The safety valve of claim 1, and further comprising:
a sensor unit having:
a magnetic element attached to the piston to determine a position of the piston.

11. The safety valve of claim 1, wherein the valve body of the safety valve is a 3/2-way valve.

12. The safety valve of claim 1, wherein the valve body of the safety valve is a 5/2-way valve.

13. A dairy installation safety valve comprising:
a valve body defining a bore, an intake in communication with the bore, an exhaust in communication with the bore, a bleed opening in communication with the bore, and an additional opening in communication with the bore;
a first spacer disposed in the bore and in communication with the intake;
a second spacer disposed in the bore and in communication with the exhaust, and the second spacer is sealed from the first spacer;
a third spacer disposed in the bore and in communication with the bleed opening, and the third spacer is sealed from the first spacer and the second spacer;
a fourth spacer disposed in the bore and in communication with the additional opening;
a nozzle joined to and defining a constricting flow pattern out of the additional opening; and
a piston slidably disposed in: the bore, the first spacer, the second spacer, the third spacer, and the fourth spacer for movement between a blocking position and a throughput position; and
the piston defines a cavity a first opening and a second opening; and
in the throughput position, the first opening is in communication with the intake and the cavity, and the second opening is in communication with the exhaust, the cavity, and the first opening, and the bleed opening is closed and the additional opening is closed; and
in the blocking position, the first opening is in communication with the third spacer and the bleed opening, and the second opening is closed, and the intake is in communication with the additional opening via a constriction of the piston.

* * * * *

UNITED STATES PATENT AND TRADEMARK OFFICE
CERTIFICATE OF CORRECTION

PATENT NO. : 10,502,330 B2
APPLICATION NO. : 15/104876
DATED : December 10, 2019
INVENTOR(S) : Reinhard Balkenhol Page 1 of 1

It is certified that error appears in the above-identified patent and that said Letters Patent is hereby corrected as shown below:

In the Claims

In Claim 1, at Column 13, Line 7, "and the bleed opening and the second opening" should read -- and the bleed opening, and the second opening --.

In Claim 13, at Column 14, Line 27, "the piston defines a cavity a first opening and a second opening" should read -- the piston defines a cavity, a first opening, and a second opening --.

In Claim 13, at Column 14, Line 32, "the cavity, and the first opening," should read -- the cavity, and the first opening; --.

Signed and Sealed this
Twenty-fifth Day of February, 2020

Andrei Iancu
*Director of the United States Patent and Trademark Office*